United States Patent [19]

Pierce

[11] E Re. 28,811

[45] Reissued May 11, 1976

[54] INTERCONNECTED LOOP DATA BLOCK TRANSMISSION SYSTEM

[75] Inventor: John Robinson Pierce, Pasadena, Calif.

[73] Assignee: Bell Telephone Laboratories, Incorporated, Murray Hill, N.J.

[22] Filed: Oct. 29, 1973

[21] Appl. No.: 410,813

Related U.S. Patent Documents

Reissue of:

[64] Patent No.: 3,731,002
Issued: May 1, 1973
Appl. No.: 79,185
Filed: Oct. 8, 1970

[52] U.S. Cl. ..... 179/15 AL
[51] Int. Cl.[2] ..... H04J 6/02
[58] Field of Search ..... 179/15 AL, 15 BD; 340/172.5

[56] References Cited

UNITED STATES PATENTS

| | | | |
|---|---|---|---|
| 2,861,128 | 11/1958 | Metzger | 179/15 BD |
| 3,165,588 | 1/1965 | Holzer | 179/15 BD |
| 3,456,242 | 7/1969 | Lubkin | 179/15 AL |
| 3,519,750 | 7/1970 | Beresin | 179/15 AL |
| 3,529,089 | 9/1970 | Davis | 179/15 AL |
| 3,569,632 | 3/1971 | Beresin | 179/15 AL |
| 3,586,782 | 7/1971 | Thomas | 179/15 AL |
| 3,597,549 | 8/1971 | Farmer | 179/15 AL |
| 3,732,374 | 5/1973 | Rocher | 179/15 AL |

OTHER PUBLICATIONS

IRE Transactions on Communications Systems, "Communication Networks for Digital Information," J. M. Unk, Dec. 1960, (pp. 207–214).

*Primary Examiner*—David L. Stewart
*Attorney, Agent, or Firm*—R. O. Nimtz

[57] ABSTRACT

A closed loop transmission system is described in which a plurality of stations have access to each loop to write messages into and read messages from standard-sized message blocks transmitted around the loop. One station in each loop provides regeneration of all message blocks. The various loops are interconnected by switching stations which respond to address information at the head of each message block to selectively switch the block to the interconnected loop. The next required address is always substituted for the current address to simplify address recognition. Alternate and redundant routing are also provided for.

14 Claims, 23 Drawing Figures

INVENTOR
J. R. PIERCE
BY R. O. Nimz
ATTORNEY

LOCAL MESSAGE FORMAT

FOREIGN MESSAGE FORMAT

SHIFT REGISTER A

HOG PREVENTION CONTROL CIRCUIT

WRITE LOGIC

COMMAND WORD ENCODER
(A-STATION ONLY)

READ LOGIC

ADDRESS REPOSITIONING CIRCUIT

INTERCONNECTED LOOP DATA BLOCK TRANSMISSION SYSTEM

Matter enclosed in heavy brackets [ ] appears in the original patent but forms no part of this reissue specification; matter printed in italics indicates the additions made by reissue.

FIELD OF THE INVENTION

This invention relates to digital transmission systems and, more particularly, to digital transmission by message block assignment on a common, time-divided transmission loop.

BACKGROUND OF THE INVENTION

It is often desirable to exchange digital information between digital machines. If such machines are separated by any significant geographic distance, it has heretofore been necessary to either purchase or lease a dedicated transmission facility between such machines, or to arrange a temporary connection between such machines by means of common carrier, switched transmission facilities. Since it is the nature of digital machines to require large amounts of digital channel capacity, but only for brief periods and only occasionally, the heretofore available facilities described above have proven very inefficient for this use. Dedicated transmission facilities, for example, remain unused the vast majority of the time. Switched, common carrier facilities tend to be restricted in bandwidth to voice frequencies and are otherwise unsuitable for digital, as contrasted with analog, transmission.

A further problem with switched facilities is the fact that it often takes more time to set up the transmission path than is required for the entire transmission of data. The telephone network requires real time transmission in the sense that signals must be delivered substantially at the same time they are generated. It therefore is standard procedure to set up the communication path in its entirety before any signals are transmitted. As a result, centralized switching has been used in the telephone plant. Digital transmission of data, on the other hand, need not be done in real time and hence it is wasteful to set up an entire connection prior to transmission. These facts tend to make presently available interconnection facilities uneconomical for intermachine digital communications.

It is an object of the present invention to provide improved digital transmission facilities for communication between digital machines.

It is a more specific object of the present invention to provide the efficiency and economy of digital transmission over large geographical areas.

It is another object of this invention to provide a national communication network for digital transmission between digital machines.

SUMMARY OF THE INVENTION

In accordance with the present invention, these and other objects are achieved by the provision of a large network of intersecting loop transmission lines. That is, each transmission line is in the form of a closed loop and adjacent loops connected with each other by way of loop intersections.

A transmission network of the type described above requires three basic digital equipment stations, a timing station, a data insertion and removal station and a loop intersecting station. For convenience, these stations may be termed A, B and C stations, respectively.

Although the loops of the network need not be synchronous, it is desirable that each loop be driven by a single clock and that all loop timing be provided by way of the carrier wave. The A-station thus serves to close the loop and to selectively repeat digital transmissions around the loop. Provisions must be made in the A-station, however, to prevent endless recycling.

The data insertion and removal B-station must be timed and synchronized by information received on the transmission line. It is preferable that the transmission time on the loop be divided into a plurality of equally sized blocks into which are placed digital messages of preselected size accompanied by address and synchronizing information. The B-station receives digital data from the source, assembles this information into message blocks, inserts the required address and synchronizing information, and launches the entire block on the transmission loop. This B-station also scans the address information of received blocks and accepts for local delivery those blocks addressed to the local digital machine.

The loop switching C-station must buffer data to accommodate different bit rates in the intersecting loops and must decide whether to transfer a block from its current loop to the other loop.

A digital communication network of the type described above has the decided advantage of making efficient use of the digital transmission facilities. Moreover, such a network can grow gradually and economically, both geographically and in traffic-handling capacity, due to the simple repeating stations which can be added to the network. Such a transmission network also allows sophisticated digital machine users to themselves provide the necessary address information and whatever error control is required. Finally, such a digital transmission network need not be supervised over the digital network itself. The voice frequency telephone network is already available for such supervision.

These and other objects and features, the nature of the present invention and its various advantages will be more readily understood upon consideration of the attached drawings and of the following detailed description of the drawings.

Figure 1:
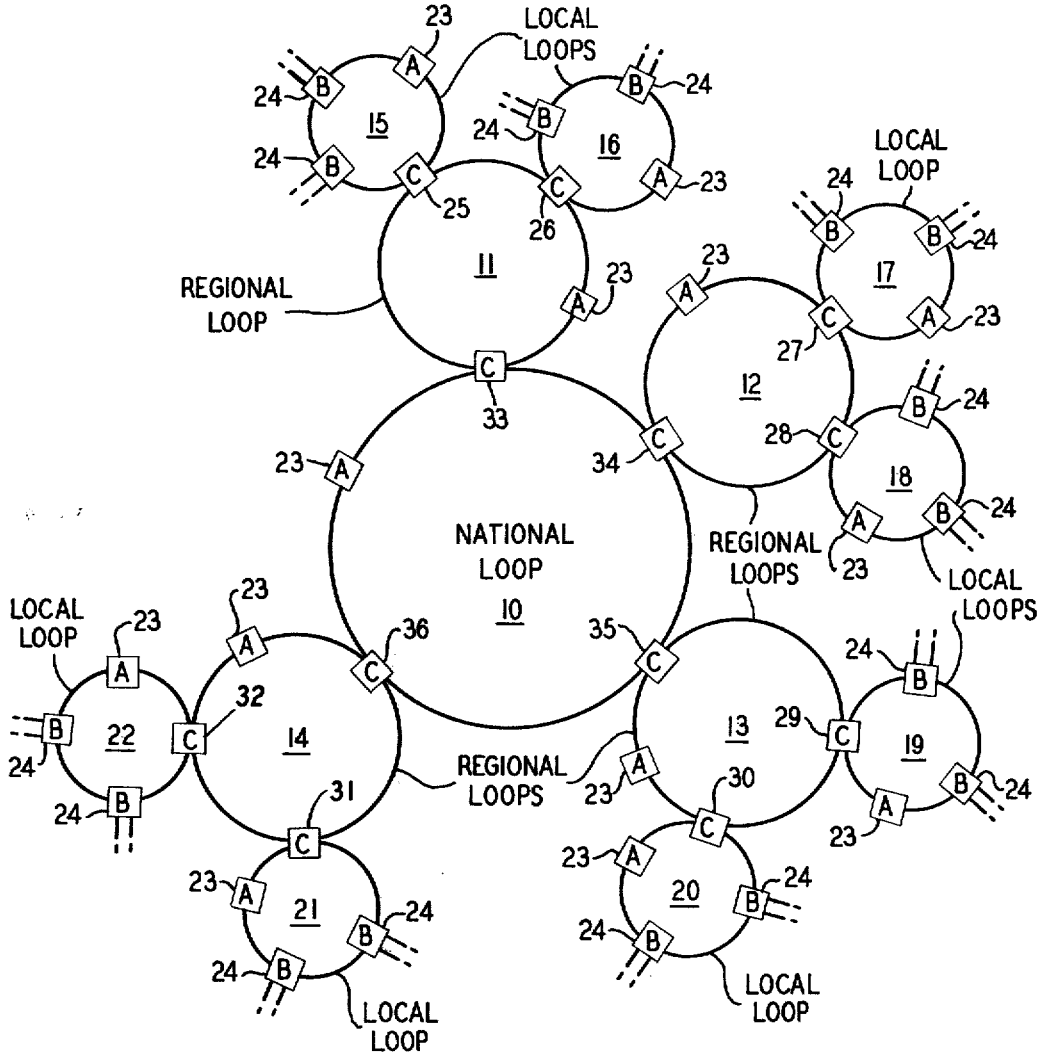
FIG. 1 is a general block diagram of a data transmission system in accordance with the present invention.
Figure 3:
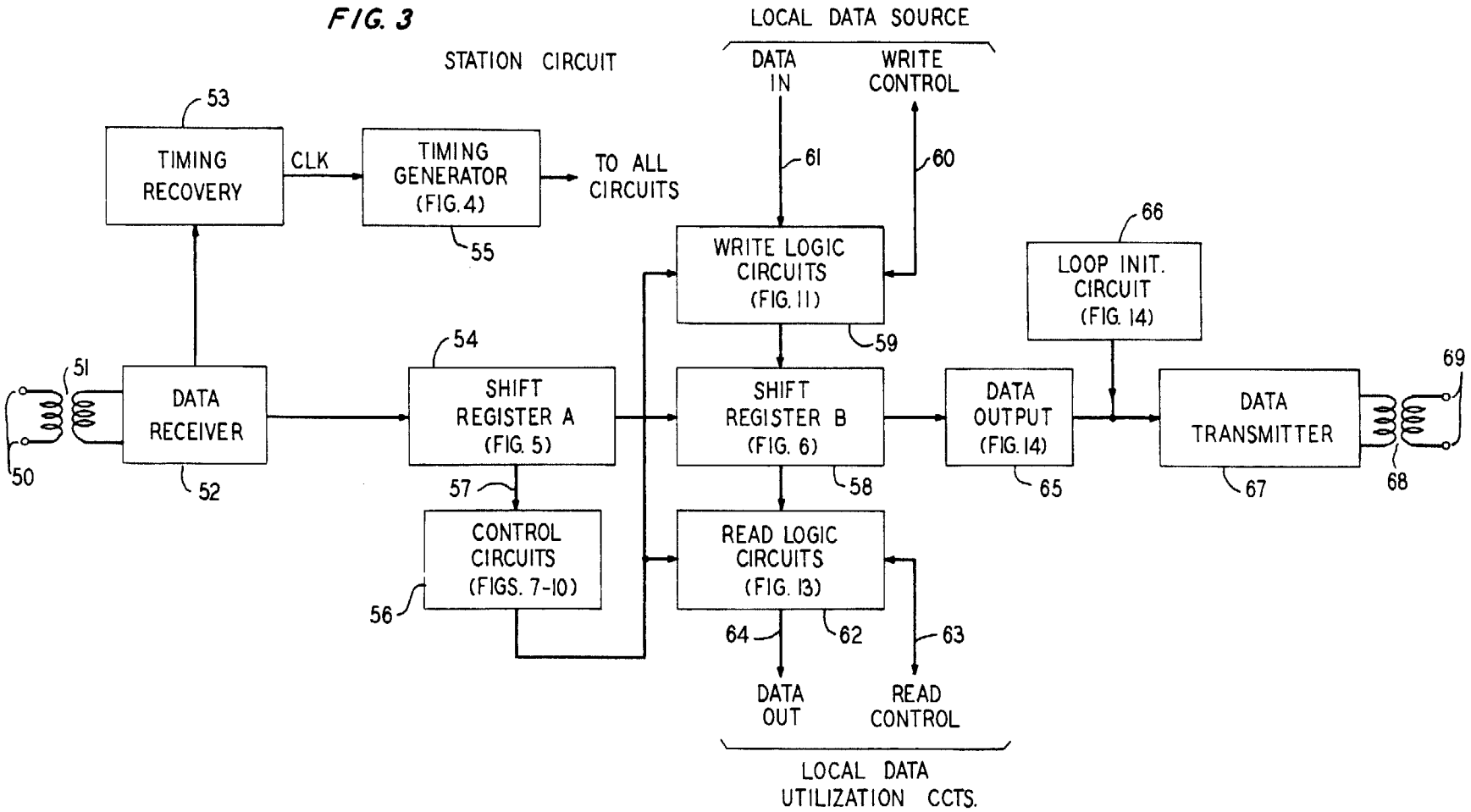
FIG. 3 is a general block diagram of a station circuit suitable for use in the system of FIG. 1.
Figure 9:
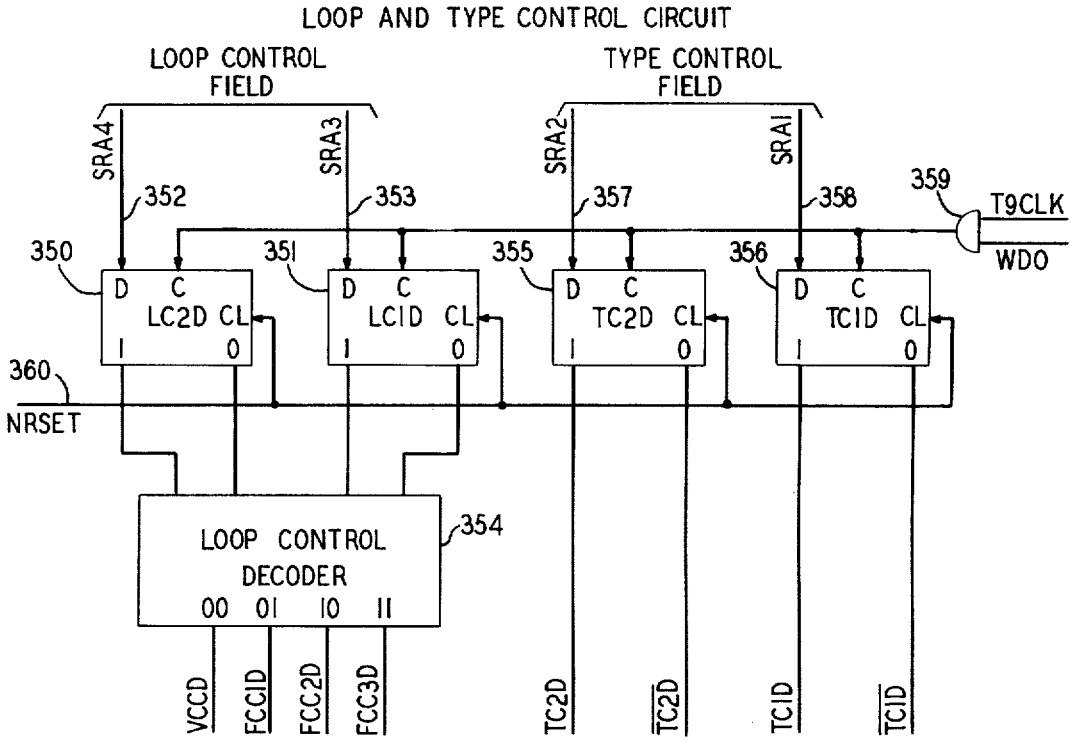
Figure 10:
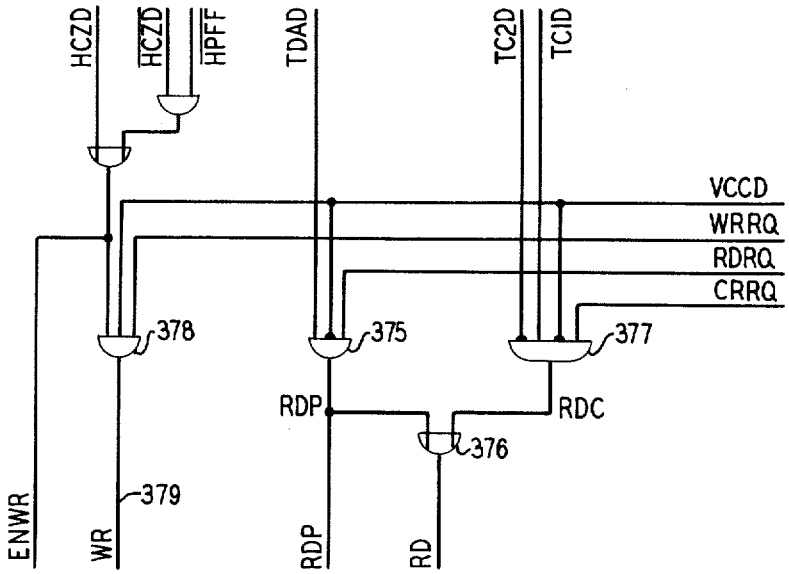
Figure 11:
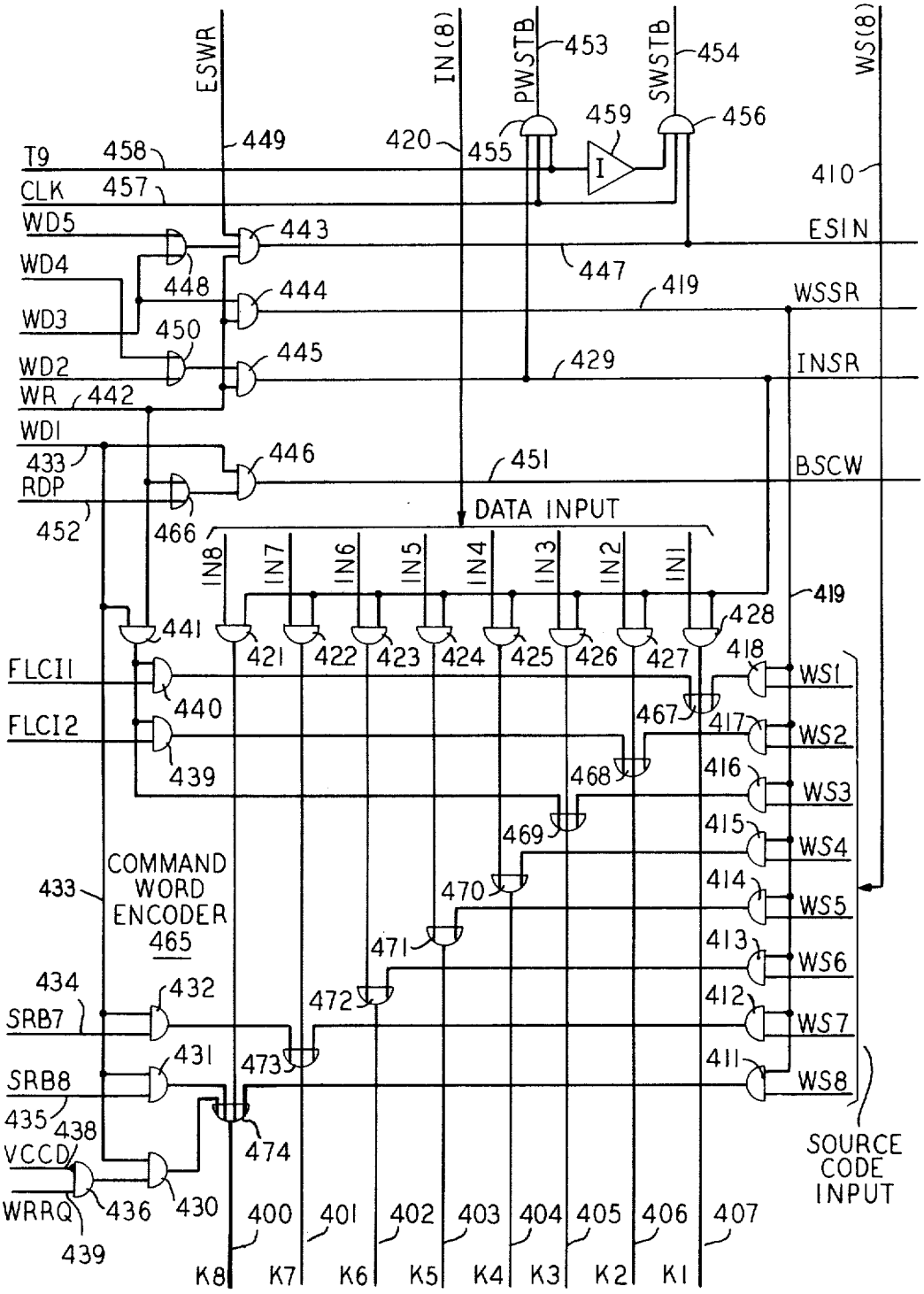
Figure 12:
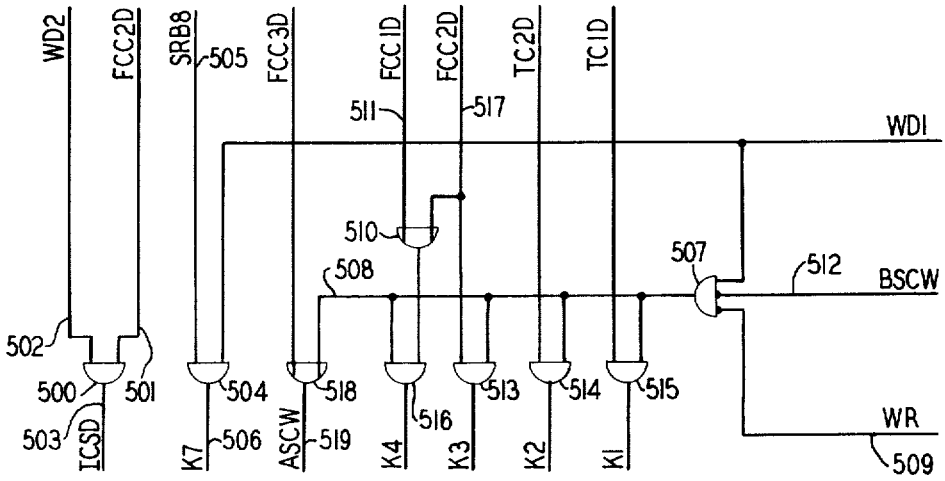
Figure 13:
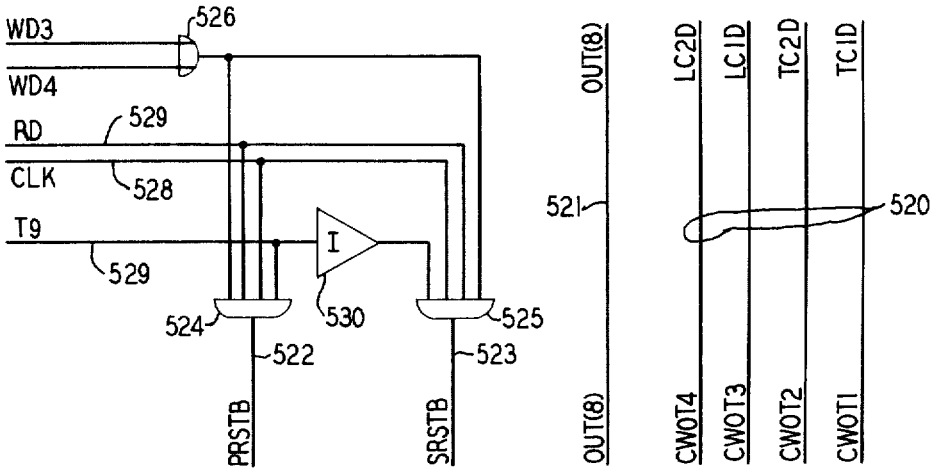
Figure 14A:
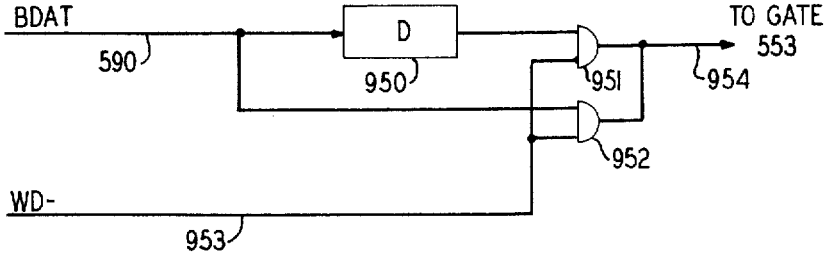
Figure 14:
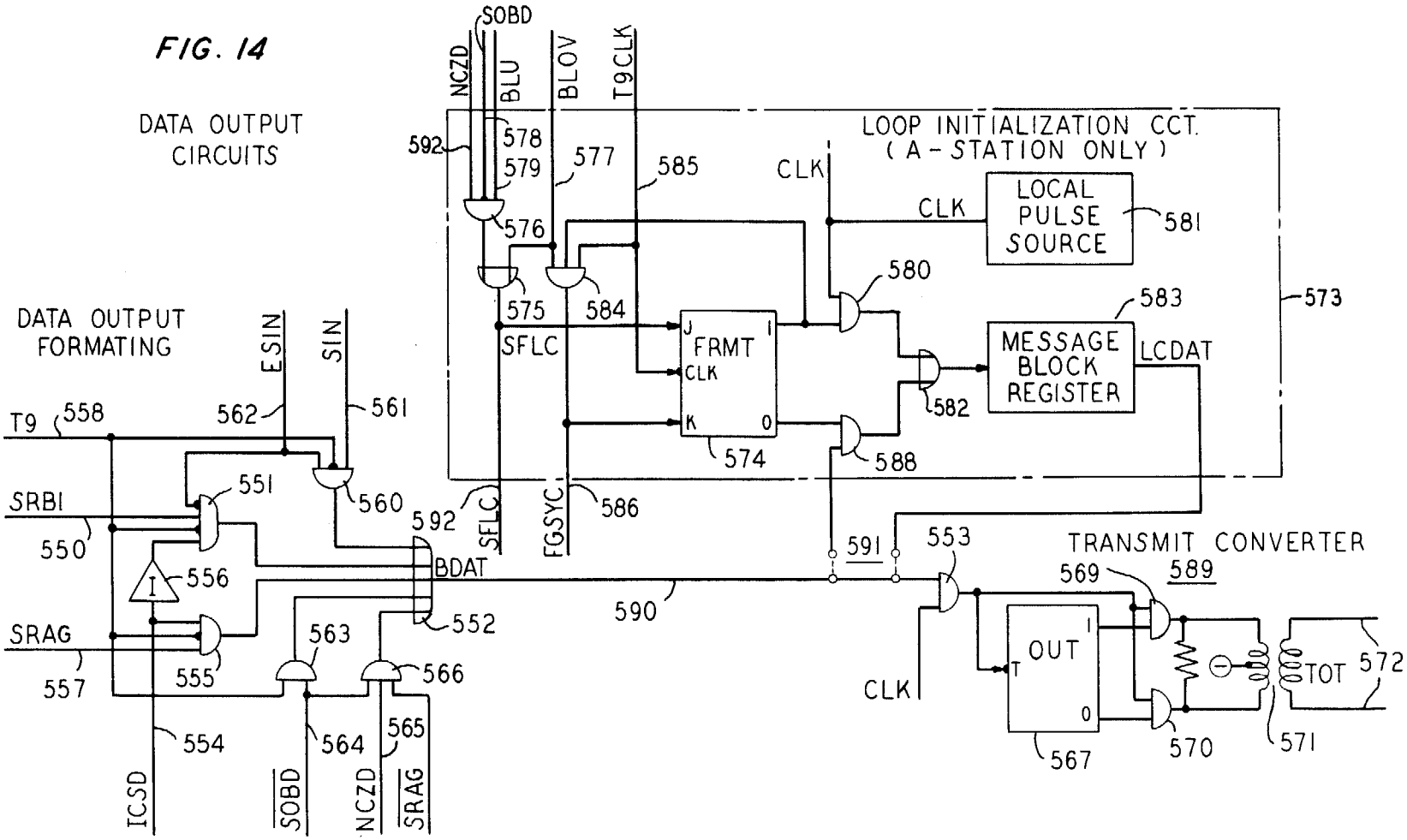
Figure 15:
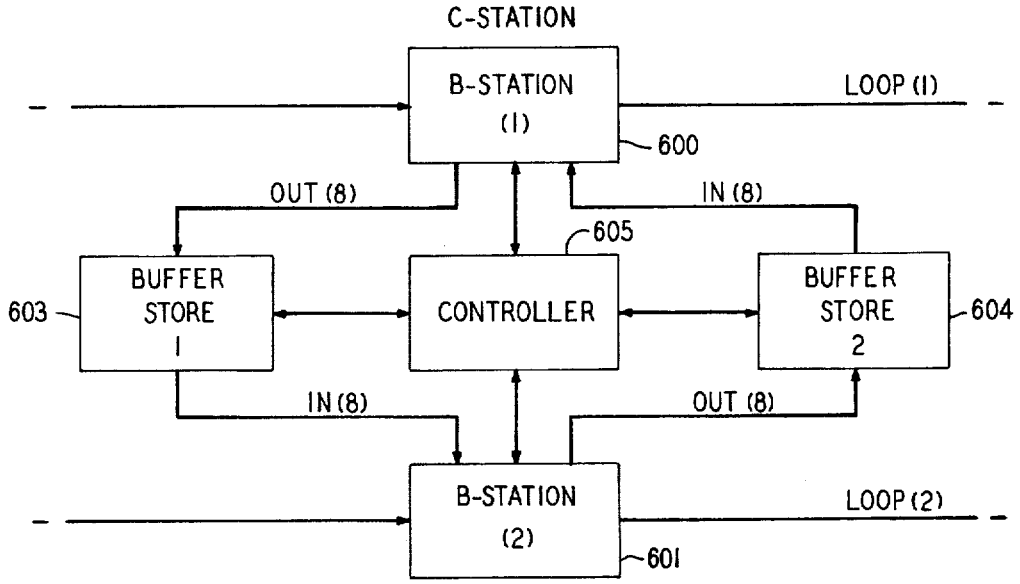
Figure 16:
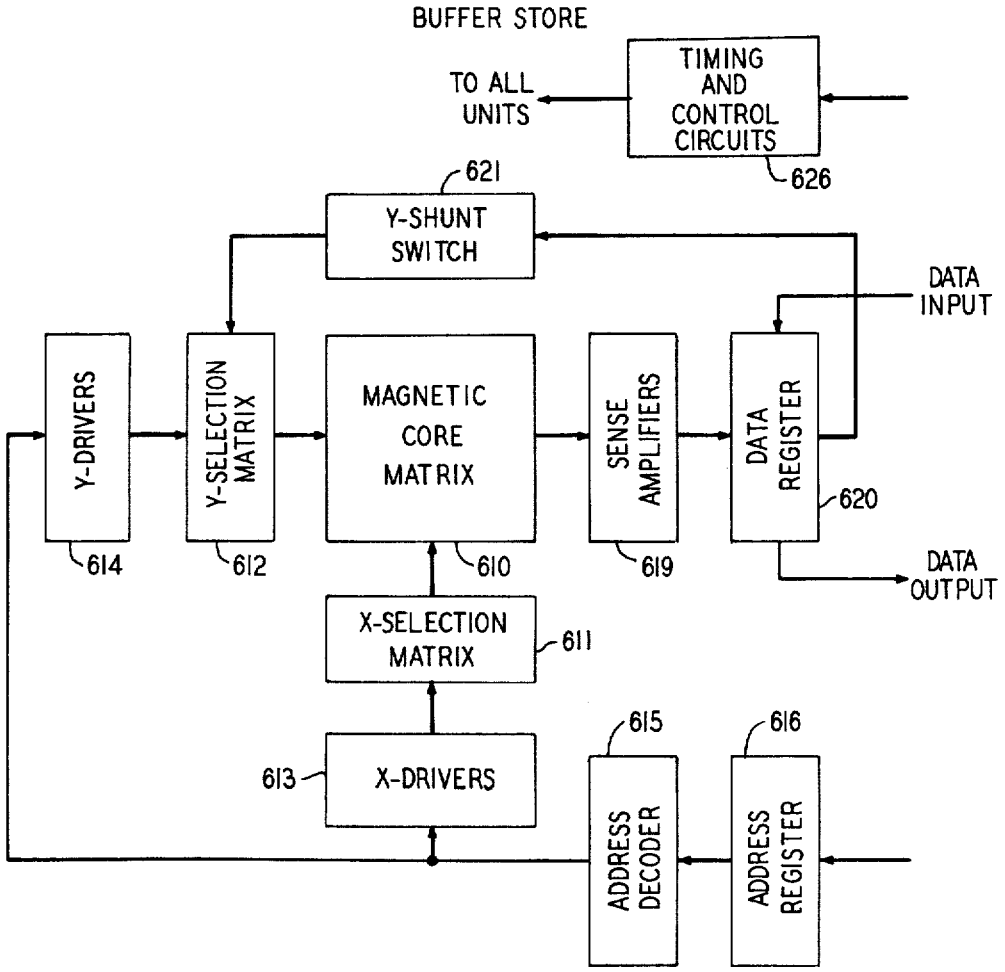
Figure 17A:
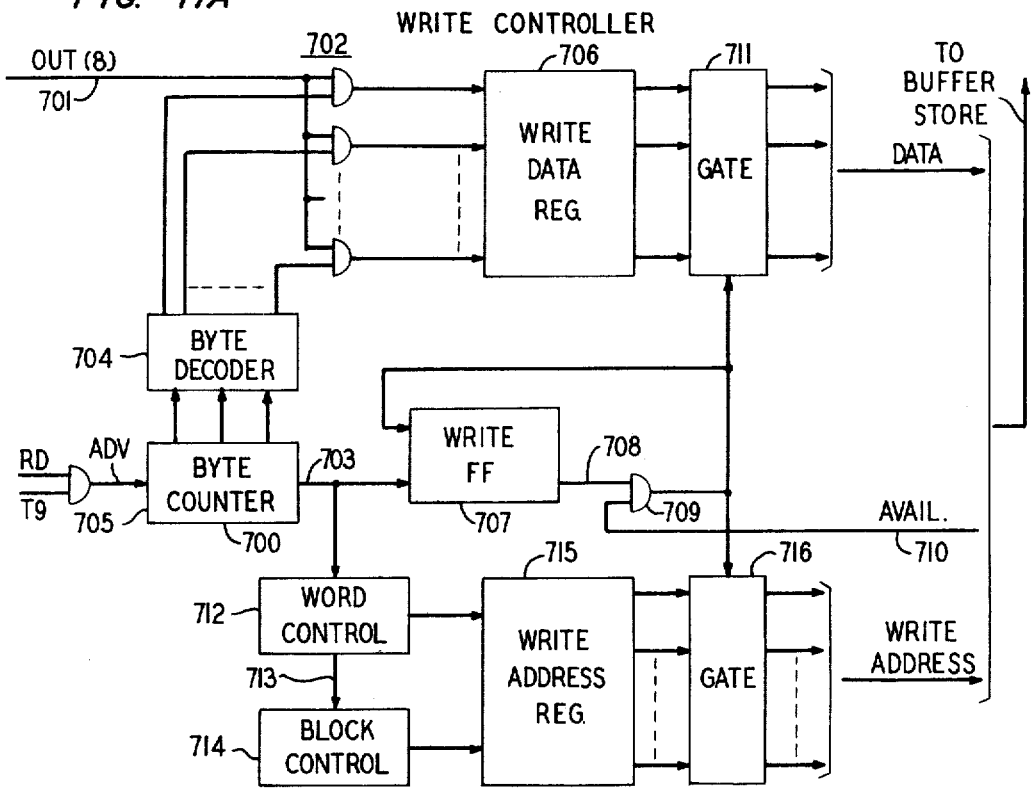
Figure 17B:
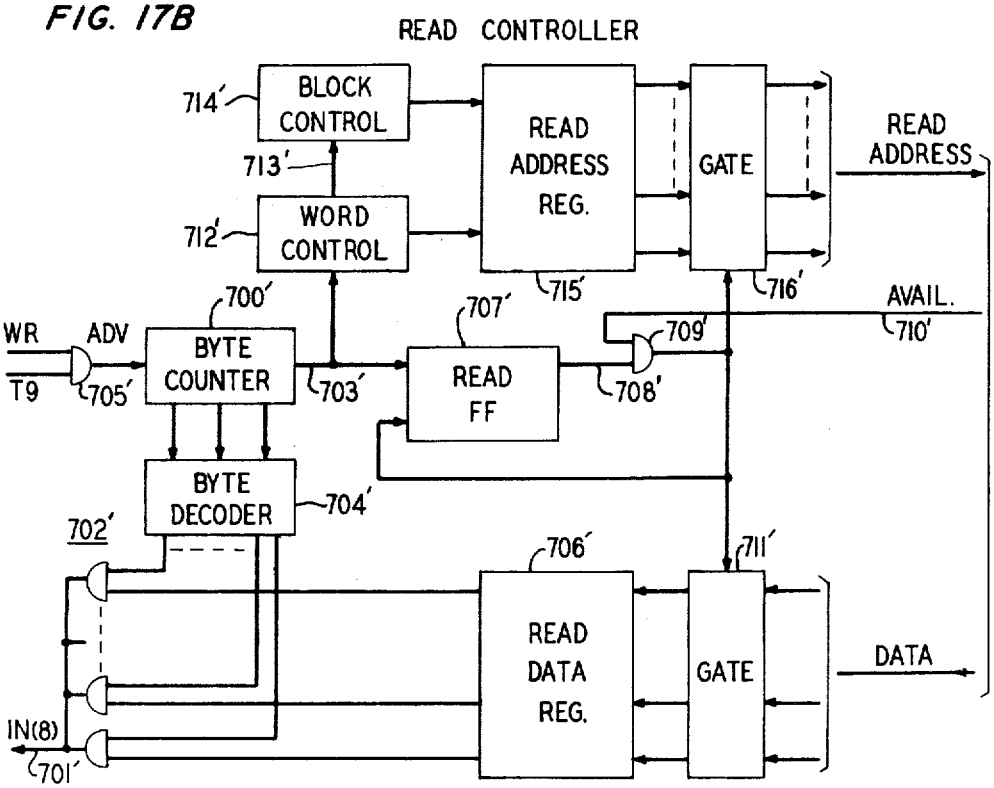
Figure 18:
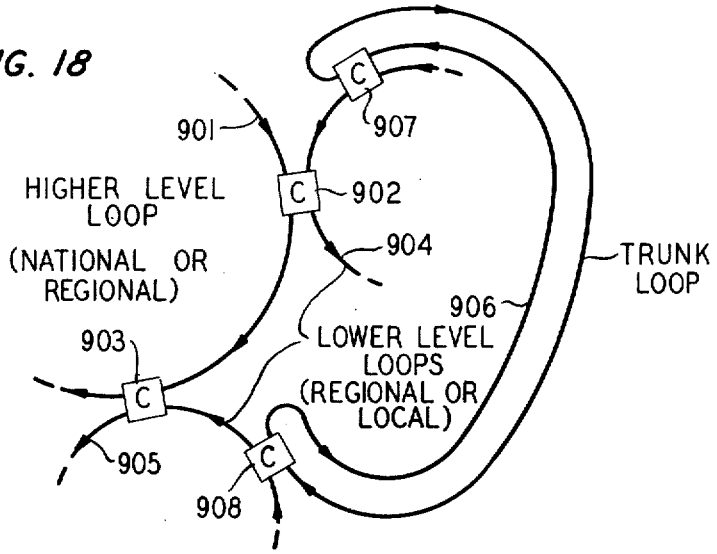
Figure 19:
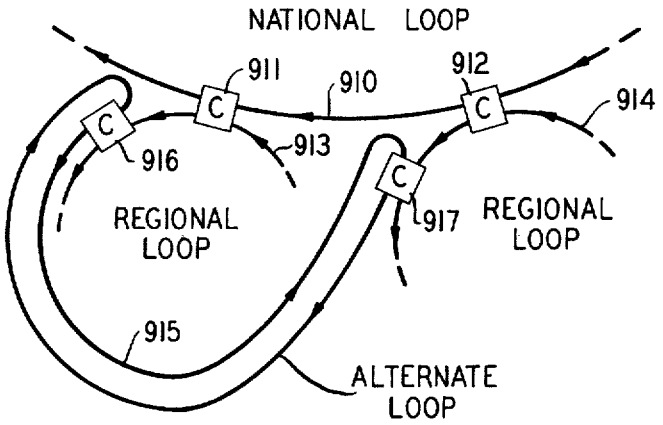
Figure 20:
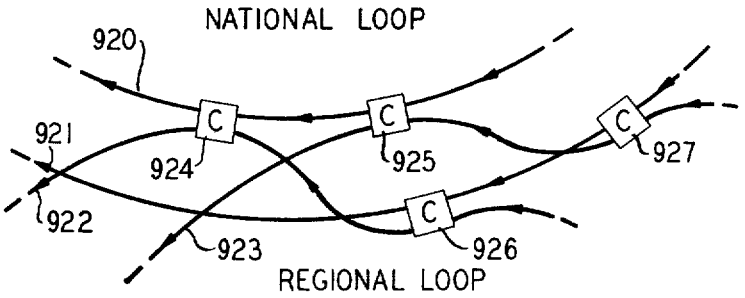

3;

FIG. 9 is a detailed circuit diagram of a loop and type control circuit useful in the control circuits of FIG. 3;

FIG. 10 is a detailed circuit diagram of a read-write control circuit useful in the control circuits of FIG. 3;

FIG. 11 is a detailed circuit diagram of a write logic circuit useful in the station circuit of FIG. 3;

FIG. 12 is a detailed circuit diagram of a command word encoder useful in the write logic circuit of FIG. 11 when used in an A-station;

FIG. 13 is a detailed circuit diagram of a read logic circuit useful in the station circuit of FIG. 3;

FIG. 14 is a detailed circuit diagram of data output circuits useful in the station circuit of FIG. 3;

FIG. 14A is a detailed circuit diagram of an address repositioning circuit useful in the output circuits of FIG. 14;

FIG. 15 is a block diagram of a C-station useful in the data transmission network of FIG. 1;

FIG. 16 is a block diagram of a buffer store unit useful in the C-station of FIG. 15;

FIGS. 17A and 17B comprise a detailed circuit diagram of a C-station controller useful in the C-station of FIG. 15;

FIG. 18 is a block diagram of a trunk loop modification of the data transmission system of FIG. 1 which allows locally heavy inter-regional traffic to avoid loading the national loop;

FIG. 19 is a block diagram of a modification of the data transmission system of FIG. 1 which allows overflow traffic to use an alternate route between regional loops; and FIG. 20 is a block diagram of a redundant loop modification of the data transmission system of FIG. 1.

DETAILED DESCRIPTION OF THE DRAWINGS

Before proceeding to a detailed description of the drawings, it should be noted that all of the circuits described herein may be realized, in the illustrative embodiment, by using integrated circuits. Each of the circuits can be found, for example, in "TTL Integrated Circuits Catalog from Texas Instruments," Catalog CC201, dated Aug. 1, 1969. Similar circuits are available from other manufacturers as listed at pages A-9 through A-24 of the CC 201 Catalog.

Referring more particularly to FIG. 1, there is shown a graphical representation of an intersecting loop data transmission system in accordance with the present invention. In a nationwide data transmission system, for example, a national loop 10 interconnects a plurality of regional loops, illustrated in FIG. 1 by regional loops 11, 12, 13 and 14. The regional loops, in turn, each interconnect a plurality of local loops. Illustratively, regional loop 11 interconnects local loops 15 and 16, regional loop 12 interconnects local loops 17 and 18, regional loop 13 interconnects local loops 19 and 20, and regional loop 14 interconnects local loops 21 and 22. The digital transmission system of FIG. 1 thus comprises a plurality of closed transmission loops which intersect at selected points to permit the transfer of digital messages between the loops. Three basic digital components are provided in FIG. 1 in addition to the transmission loops themselves.

First, there is provided a timing unit labelled as station "A" for closing each loop. Thus loops 10 through 22 are each provided with an A-station 23, all of which are identical. The A-stations serve to provide synchronization and timing for the associated loops and permit the loops to be closed on themselves.

Data access stations 24, called "B-stations," are provided on all of the local loops 15 through 22 to permit access to the local loops by data sources and/or data sinks. Any number of B-stations can be included on each local loop. Regional loops 11 through 14, and national loop 10, differ from the local loops only in that no data access B-stations are found on loops 10 through 14.

A special unit, called a "C-station" is placed at the intersections between the loops. Thus, C-stations 25 and 26 form the intersections between regional loop 11 and local loops 15 and 16, respectively; C-stations 27 and 28 form the intersections between regional loop 12 and local loops 17 and 18; C-stations 29 and 30 form the intersections between regional loop 13 and local loops 19 and 20; and C-stations 31 and 32 from the intersections between regional loop 14 and local loops 21 and 22. Similarly, C-stations 33, 34, 35 and 36 form intersections between regional loops 11, 12, 13 and 14, respectively, and national loop 10.

The network of FIG. 1 is only illustrative of the types of data networks envisioned by the present invention. The geographical extent of each loop and the number of access ("B") stations on each loop depends upon the information capacity of the associated loop and the loading provided by each access station. It is anticipated that the various loops will have differing channel capacities, depending of these factors. Moreover, transmission on these loops need not be synchronous and the speed of transmission on different loops can be different.

In operation, data to be transmitted on the system is inserted on a local loop at one of the B-stations in a standard length message format and associated with an appropriate address. This message block transverses the local loop until a C-station is reached to which a loop transfer must take place in order to deliver the message block to the designated address. If the destination is on the local loop, of course, the message will be delivered to that destination without ever leaving the local loop.

In transferring blocks of information from one loop to another, buffering is provided at the C-stations to take care of any differences in bit rates or timing. This buffer must be of an appropriate size to prevent excessive message blocking due to buffer overload. The operation of the system of FIG. 1 will be more readily understood upon consideration of the message block formats shown in FIGS. 2A and 2B.

Figure 2A:
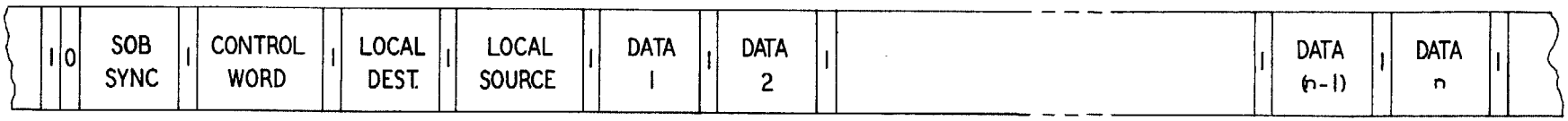
FIGS. 2A and 2B are suggested message formats for data blocks to be transmitted on the transmission system of FIG. 1.
Figure 2B:
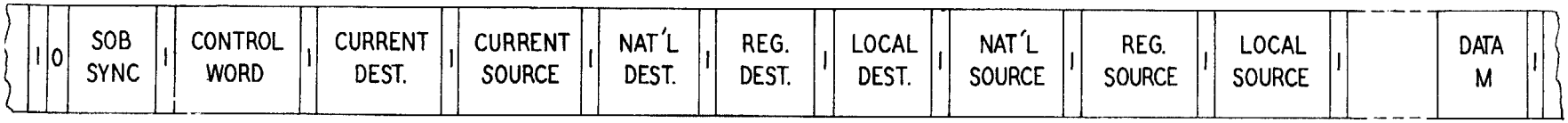

As can be seen in FIGS. 2A and 2B, each message block consists of a sequence of digital words of standard length. The number of such digital words in each message block is fixed. In the illustrative embodiment of FIGS. 2A and 2B, the message format is composed of 128, 8-bit words, each separated from the others by a guard bit. All of the guard bits are "1's" to prevent long strings of "0's" which would make it difficult to maintain synchronization. Synchronization and timing recovery is also greatly simplified by the repetitive patterns of "1" bits. The above framing bit pattern is violated in only one circumstance: a "0" bit is placed in the initial guard bit preceding the first word of the message block. A Start-of-Block code comprising all "0's" forms the first word of each message block. Thus, the "0" guard bit, together with the "0's" of the Start-of-Block code, provide the only occurrence of nine consecutive "0's." this occurrence can be detected to start framing and initiate block access for reading or writing purposes.

The second word of each message block comprises a control word which carries a coded representation of the status of the message block, i.e., whether the block is vacant or full, whether the message is private or broadcast, whether the message is for local or foreign delivery and other conditions to be hereinafter described. The detailed contents of this control word will be described later in connection with FIG. 1.

The third word of each message block comprises a destination code indicating the destination to which the message block is to be delivered. Although only one word has been reserved for the destination code in FIG. 2A, it is apparent that two or more words may be used for this purpose in order to accommodate the required number of destinations. Similarly, the source code in the fourth word of FIG. 2A may likewise occupy two or more words of a message block depending upon the number of bits required to distinguish between all of the possible sources.

Following the source code in FIG. 2A is a plurality of data words comprising the substance of the message blocks. This data is supplied by the user of the system as a serial sequence of binary bits which the B-stations 22 arbitrarily divide up into 8-bit words. Users of the system may therefore provide their own error control by way of redundant coding. The message format of FIG. 2B will be discussed in connection with FIG. 15.

In FIG. 3 there is shown a general clock diagram of a station circuit useful as A or B-stations in the communication system of FIG. 1. Digital signals traversing a loop appear at input terminals 50 and are applied via isolating transformer 51 to data receiver 52. Data receiver 52 demodulates the received signals and, if necessary, translates the binary signals to the appropriate voltage levels required for the balance of the circuits, passing the signals to timing recovery circuit 53 and shift register 54.

Timing recovery circuit 53 utilizes the pulse repetitions of the message block to synchronize a local clock in order to provide timing information for the balance of the circuits. The clock pulses thus provided are supplied to timing generator circuit 55 which provides all of the timing pulses required to synchronize the operations of the balance of the circuit. The timing generator 55 will be discussed in greater detail in connection with FIG. 4.

Figure 5:
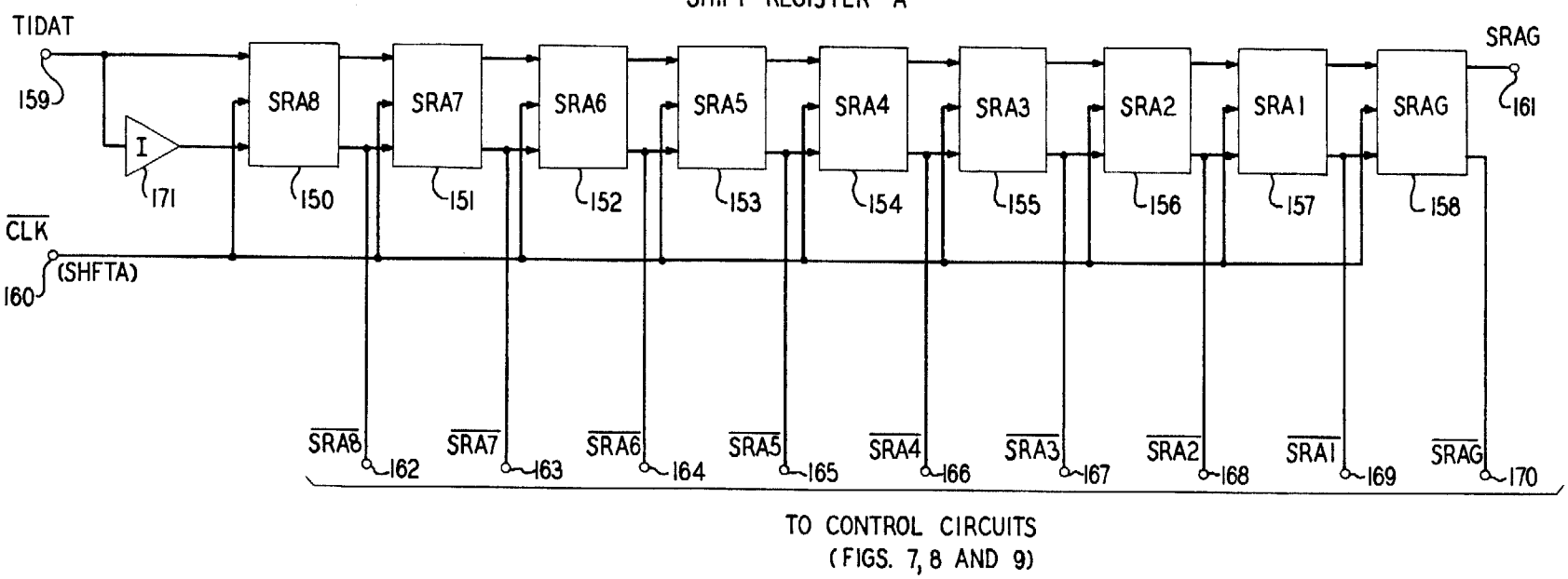
FIG. 5 is a detailed circuit diagram of a parallel read shift register useful as Shift Register A in FIG. 3.

Shift register 54, which will be described in greater detail in connection with FIG. 5, is a serial input, serial output, 9-bit shift register having parallel access to all of the stages for reading purposes. Thus, the outputs of all of the stages of shift register 54 are made available to control circuits 56 by way of leads 57.

The control circuits 56 respond to the various codes in the first three words of each message block to initiate and control the operation of the station circuit of FIG. 3. Control circuits 56, for example, detect the Start-of-Block synchronizing code, detect the data block control word, and detect the loop destination code. These control circuits will be discussed in greater detail in connection with FIGS. 7 through 10.

The output of shift register 54 is applied to shift register 58 which is an eight-stage, serial input, serial output shift register with both parallel reading and parallel writing access thereto. Thus, write logic circuits 59, under the control of signals from control circuits 56 and signals from a local data source by way of leads 60, control the writing of data appearing on leads 61 in series or in parallel into shift register 58. Similarly, read logic circuits 62, under the control of signals from control circuits 56 and signals on read control leads 63, permit the reading, in series or in parallel, of message words from shift register 58 onto data output leads 64. It can thus be seen that message blocks can be entered into and removed from the transmission loop one word at a time by way of shift register 58.

The serial output of shift register 58 is applied to data output circuits 65, to be discussed in more detail in connection with FIG. 14. In general, data output circuit 65 inserts or reinserts the one-bits in the guard spaces between message words and, when necessary, interchanges the source and destination codes in order to return undelivered messages to the sender.

A loop initialization circuit 66 is provided for A-stations only and is used to initilize the loop when message block framing is lost. In general, this is accomplished by inserting nine zeroes followed by all ones on the loop. The loop initialization circuit 66 will be discussed in more detail in connection with FIG. 14.

The output of data output circuits 65 is applied to a data transmitter 67 which may be used to remodulate the data to be desired frequency range for transmission on the loop. This modulated data is transmitted by way of isolating transformer 68 and output terminals 69 to the transmission loop.

The block diagram of FIG. 3 performs all of the functions necessary for A- or B-stations in FIG. 1. Slight modifications are required for A-station use. Clock signals, for example, may be provided from a local pulse source rather than from a timing recovery circuit 53. The read and write logic circuits 62 and 59 are not required since no data access takes place at the A-station. The loop initialization circuit 66, however, is required. Most of the balance of the circuitry of FIG. 3 can be identical in B-stations and in A-stations. Indeed, susbstantial manufacturing savings may be effected by constructing a single station which can be manually modified to serve as either an A-station or a B-station.

In order to better understand the various control signals utilized in the realization of FIG. 3, as illustrated in detail in FIGS. 4 through 14, the logic signals appearing on each lead have been indicated by an alphanumeric sequence which forms a code for the logic value. For a better understanding of these signals, the following glossary of logic terms is provided and can be referred to in connection with the balance of the figures.

| Glossary of Terms | |
|---|---|
| ADAT | A-station loop data |
| ASCW | Enable A-station control codes to SRB |
| BCT(X) | Bit counter flip-flop X |
| BDAT | B-station loop data |
| BLC(X) | Block length counter; bit X |
| BLOV | Block length oversize |
| BLUN | Block length undersize |
| BSCW | Enable B-station control codes to SRB |
| CLK | Clock |
| CRRQ | Common read request |
| CWOT(X) | Data block control word out; bit X |
| ENLDB | Enable loading of B Register |
| ENWR | Enable write |
| ESIN | Enable serial input |
| ESWR | Enable serial write |
| FCCID | Block full and has not passed A. station code detected |

-continued

| | Glossary of Terms |
|---|---|
| FCC2D | Block full and passed A-station code detected |
| FCC3D | Block full with S & D interchanged code detected |
| FERR | Format Error |
| FGSYC | Format loop generated sync (write 9 zeros) |
| FLCI(X) | Foreign/local control word in; bit X |
| FRMT | Format loop |
| HCZD | HC field zero detected |
| HPFF | HOG prevention flip flop |
| ICSD | Interchange source and destination codes |
| IN(X) | Parallel data in; bit X |
| INSR | Enable input to SRB |
| K(X) | Bit X input to SRB |
| LC(X)D | LC field bit X detected |
| LCDAT | Loop closing buffer data out |
| LDSRB | Load shift register B |
| LPCW | Loop Closing Buffer Write Gate |
| NCZD | Nine consecutive zeroes detected in SRA |
| NRSET | Nine consecutive zeroes detected Reset |
| OUT(X) | Parallel data out; bit X |
| PRSTB | Parallel read strobe |
| PWSTB | Parallel write strobe |
| PBLC | Reset Block Length Counter |
| RD | Terminal reading data from line |
| RDC | Terminal reading common message |
| RDP | Terminal reading private message |
| RDRQ | Read request |
| SFLC | Start format loop cycle |
| SIN | Serial data input |
| SHFTB | Shift register B |
| SOBD | Start of Block detected |
| SOUT | Serial data out |
| SRA(X) | Shift register A; bit X |
| SRB(X) | Shift register B; bit X |
| SRSET | Start of block reset |
| SRSTB | Serial read strobe |
| SWSTB | serial write strobe |
| TAD | Terminal destination comparison gate |
| TC(X)D | TC field bit X detected |
| TDAD | Terminal destination address detected |
| T1CLK | T1 repeater clock |
| T1DAT | T1 repeater data |
| T9 | Bit time 9 |
| T9CLK | Bit time 9 clock |
| VCCD | Vacant control code detected |
| WCT(X) | Word counter; bit X |
| WD(X) | Word time X |
| WR | Terminal writing data onto line |
| WRRQ | Write request |
| WS(X) | Wired source address; bit X |
| WSSR | Enabled wired source code to SRA |
| WOT9 | Word zero bit time nine |
| WOT9D | WOT9 delayed |
| W1T9 | Word one bit time nine |
| XCLK | Crystal clock |
| ZERO | Contents of SRA is zero |

Figure 4:
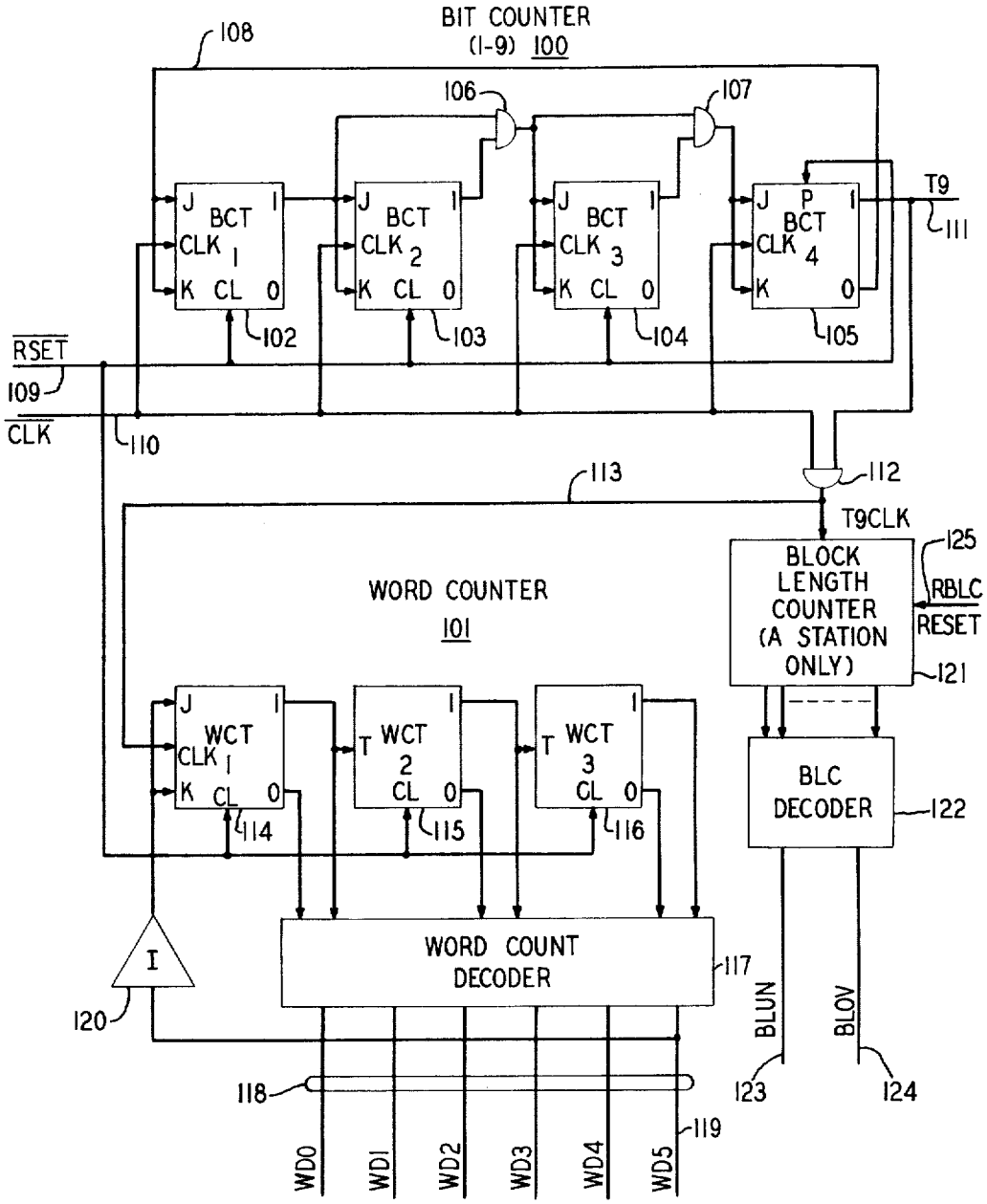
FIG. 4 is a detailed circuit diagram of a timing generator circuit useful in the station circuit of FIG. 3.

In FIG. 4 there is shown a detailed circuit diagram of a timing generator circuit useful as timing generator 55 in FIG. 3. The timing generator of FIG. 4 comprises a four-stage bit counter 100 and a three-stage word counter 101. Bit counter 100, in turn, comprises stages 102, 103, 104 and 105 and is arranged to recycle after a count of nine by means of AND gates 106 and 107 and a feedback path 108 from counting stage 105 to counting stage 102. The bit counter 100, after being preset to an initial state by an SRSET signal on lead 109, counts clock pulses on lead 110, producing an output pulse on lead 111 once for every nine clock pulses. This T9 pulse on lead 111 is combined with a clock pulse on lead 110 in AND gate 112 to provide a T9CLK pulse on lead 113. This T9CLK pulse forms the input to word counter 101.

Word counter 101 comprises stages 114, 115 and 116 connected in cascaded fashion and having the outputs of each of these stages supplied to a word count decoder 117. Word counter 101, after being preset to an initial state by a signal on lead 109, counts T9CLK pulses on lead 113. Word count decoder 117 utilizes the binary outputs of stages 114, 115 and 116 to provide output signals sequentially on output leads 118. The signals on leads 118 delineate the word intervals illustrated graphically in FIG. 2. The output on the last word lead 119 is supplied by way of inverting circuit 120 to disable the input to stage 114. In this way, the word counter 101 counts up to a word count of five and then remains latched there until reset by a signal on lead 109.

When the circuits of FIG. 4 are used in an A-station, a block length counter 121 is also provided to count the words in the entire message block. A block length decoder 122 provides an output signal on lead 123 when the block length count is less than the desired value and provides an output signal on lead 124 when the block length count exceeds the desired block length. These underlengths (BLUN) and overlength (BLOV) signals are used to control the loop initialization circuits to be desired hereinafter in connection with FIG. 14. Counter 121 is reset to its initial state by an RBLC signal on lead 125.

Referring to FIG. 5, there is shown a detailed circuit diagram of shift register A, useful as shift register 54 in FIG. 3. The shift register of FIG. 5 comprises nine stages, 150 through 158. Serial input data (derived from data receiver 52 in FIG. 3) appears at input terminal 159 and is applied directly to the set input of the first stage 150, and through inverter 171, to the reset input of stage 150. Inverted clock pulses (from timing recovery circuits 53 in FIG. 3) appear at terminal 160 and are applied to all of stages 150 through 158 to advance the data signals through these stages. The serial output pulses from the shift register of FIG. 5 appear at output terminal 161.

The individual stages 150–158 of the shift register of FIG. 5 also provide parallel output signals to output terminals 162 through 170 respectively. It is therefore apparent that data can be written into the shift register of FIG. 5 in a serial fashion from terminal 159, may be read out of shift register A in a serial fashion via terminal 161, and may be read out of shift register A in parallel by way of terminals 162 through 170. The outputs at terminals 162 through 170 are connected to the control circuits 56 (FIG. 3) which will be discussed in more detail in connection with FIGS. 7 through 9. In general, the first three words of each message block, as they pass through the shift register of FIG. 5, are applied in parallel to the control circuits of FIGS. 7 through 9 to control the operation of the station.

Figure 6:
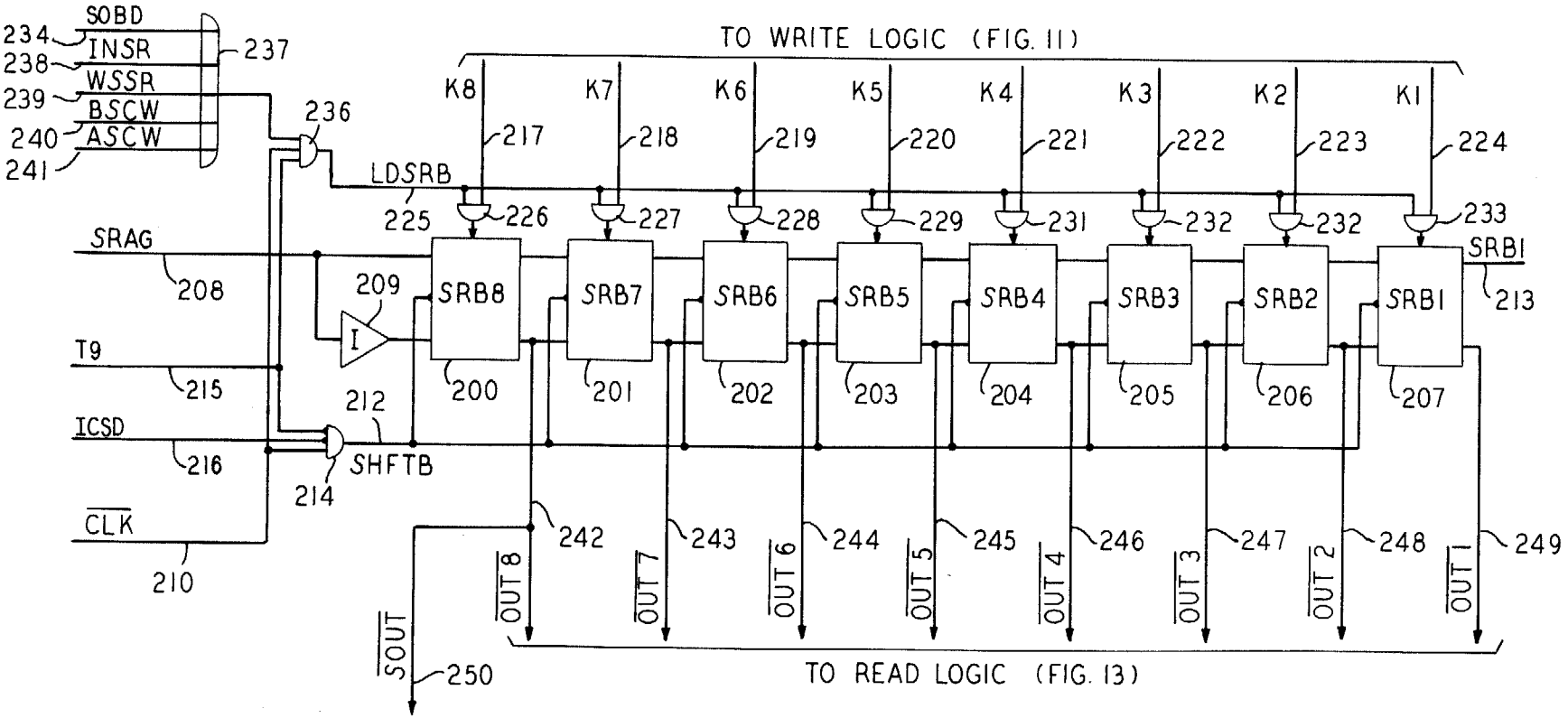
FIG. 6 is a detailed circuit diagram of a parallel read-write shift register useful as Shift Register B in FIG. 3.

Referring more particularly to FIG. 6, there is shown a detailed circuit diagram of shift register B, useful as shift register 58 in FIG. 3. The shift register of FIG. 6 comprises eight stages, 200 through 207. Serial data, appearing at input lead 208 (derived from terminal 161 in FIG. 5), is applied to the first stage 200 both directly and after inversion in inverter 209. Shift pulses appearing on bus 212 are applied to all of the stages 200–207 to advance data through these stages. Serial output data appears on output lead 213.

The shift pulses on bus 212 are derived from gate 214, having one enable input and two disable inputs. Inverse clock pulses from lead 210 are applied to the enable input. The output of OR gate 251 is applied to one disable input, and T9 timing pulses (from lead 111 in FIG. 4) are applied to the other disable inputs of gate 214. Shift register B therefore advances only during the eight word-bit intervals and no advance takes place during the T9 clock pulse interval as determined by T9 signals on lead 215.

The ICSD signal on lead 216 is also applied to disable gate 214. This signal indicates that the source and destination codes at the beginning of the message block should be interchanged to return an undelivered message block to the sender. This is accomplished by retaining the destination code in shift register B and gating the source code from shift register A. This procedure will be described in greater detail in connection with FIG. 14.

Shift register B in FIG. 6 can be loaded in parallel from input leads 217 to 224 by means of a loading signal on bus 225. The loading signal on bus 225 is applied simultaneously to AND gates 226 through 233 to gate signals from leads 217 to 224, respectively, to the corresponding one of stages 200 through 207, and to force these stages to the corresponding states, whether "0" or "1."

The loading signal on bus 225 is derived from the output of AND gate 236. Gate 236, in turn, is enabled by the simultaneous application of an inverse clock pulse from lead 210, a T9 pulse from lead 215, and the output from OR gate 237. The inputs to OR gate 237 comprise a signal on lead 234, indicating the detection of a start-of-block signal, a signal on lead 238, indicating that data input is available for writing into shift register B; a signal on lead 239, indicating that the local source code is available for writing into shift register B; a signal on 240, indicating that station control codes for a B-station are available for writing into shift register B; and, finally, a signal on lead 241, indicating that station control codes for an A-station are available for writing into shift register B.

Parallel inputs from stages 200 through 207 are available on leads 242 through 249, respectively, for delivery to the read logic circuit of FIG. 13. The output of stage 200 appearing on output lead 242 can also be used as a serial output of the same data when it is delivered by way of lead 250.

It can be seen that the shift register of FIG. 6 provides serial input, serial output, parallel write-in and parallel read-out. In general, shift register B provides the access point to which locally derived data may be entered into a message block on the transmission loop and from which data can be read from the message block to a local data utilization circuit. Such reading and writing is done in words of eight bits, one word at a time, under the control of signals to be described hereinafter.

Figure 7:
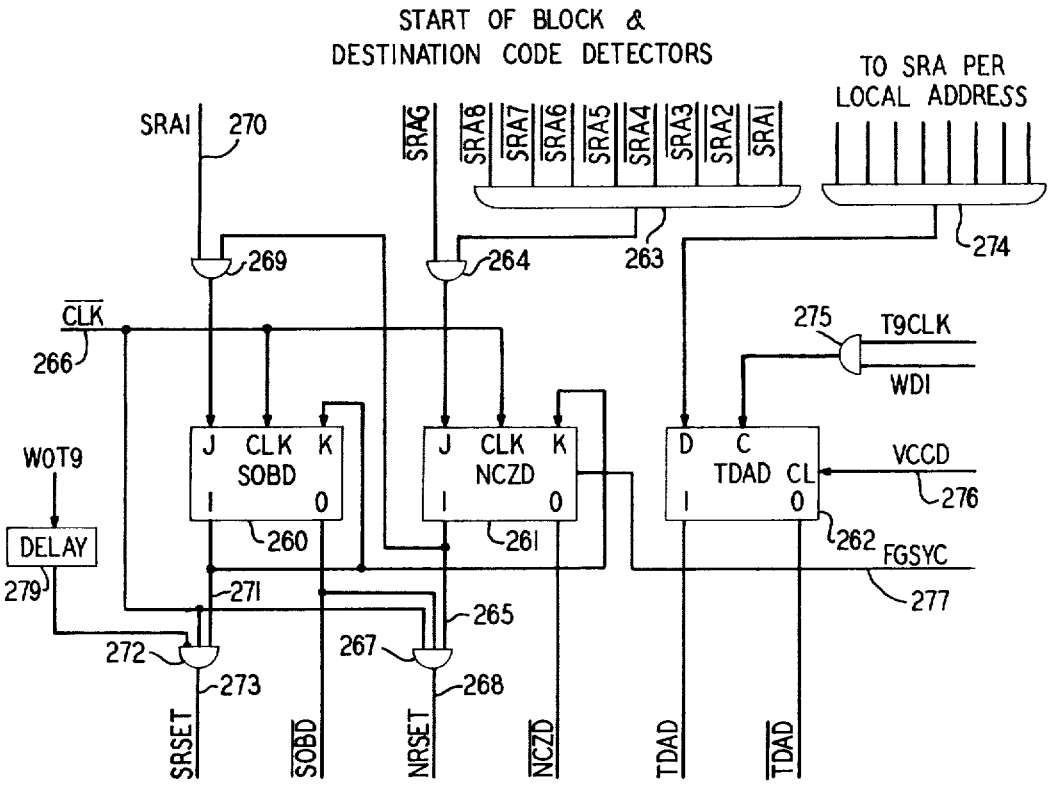
FIG. 7 is a detailed circuit diagram of a start-of-block and destination code detector useful in the control circuits of FIG. 3.

In FIG. 7 there is shown a detailed circuit diagram of a portion of the control circuits 56 of FIG. 1. The circuits of FIG. 7 comprise a Start-of-Block detector suitable for detecting the nine zeroes Start-of-block synchronizing code illustrated in FIG. 2, and for detecting a destination code corresponding to the local data utilization circuit. To this end, three flip-flops 260, 261 and 262 are provided. An AND gate 263 detects zeroes in the first eight stages of shift register A of FIG. 5 more AND gate 264 utilizes this condition in coincidence with a zero output from the last stage to produce a signal to set NCZD flip-flop 261. An output is thus produced on output lead 265, which upon the appearance of the next succeeding clock pulse at lead 266, and provided there is no "0" output from flip-flop 260, fully enables AND gate 267 to provide an NRSET reset signal on lead 268. This reset signal is used to initialize all of the circuits of the station for the reception of the message block. It will be noted that only the first word of a message block will present nine consecutive zeroes to this detection circuit and thus provides a unique framing signal for the message block.

The output of flip-flop 261, appearing on lead 265, is also applied to one input of AND gate 269. A "1" signal output from the next to last stage of shift register A, appearing on lead 270, completes the enablement of AND gate 269, setting Start-of-Block detecting flip-flop 260 to the 1-output state, thus providing a signal on lead 271. This output on lead 271 is applied to AND gate 272 which, when completely enabled by the next clock pulse on lead 266, and provided no delayed WOT 9D pulse from delay circuit 279 appears, provides an output pulse to lead 273. This output pulse is used to preset the counters 100 and 101 of the timing generator of FIG. 4 and thus initiate a timing cycle. Flip-flops 260 and 261 are reset by the 1-output of flip-flop 260 appearing on lead 271. Flip-flop 261 may be set to the "1" output condition by an FGSYC signal on lead 277 from FIG. 14, indicating that loop initialization is taking place.

It can be seen that flip-flops 260 and 261, together with the associated logic circuitry, detect the Start-of-Block synchronizing code and detect the next following guard bit to initiate the timing signals. Each new message block resynchronizes the station timing circuits by way of these detection circuits.

Also shown in FIG. 7 is a terminal destination address detector comprising flip-flop 262 which is set by the output of AND gate 274. The eight inputs to AND gate 274 are wired to the stages of shift register A in FIG. 5 according to a pattern which detects the address code of the local data utilization circuits.

Flip-flop 262 can be set only in the presence of an output from AND gate 275 to which there is applied the T9CLK pulses from lead 113 in FIG. 4 and the WDI pulses from the appropriate one of leads 118 in FIG. 4. Flip-flop 262 is reset by a VCCD signal on lead 276, indicating that the received block is vacant or unused. It can thus be seen that flip-flop 262 is set whenever the message being received is destined for the local B-station and is reset if the message block is vacant. The output of flip-flop 262 is used (in FIG. 10) to initiate a block reading sequence.

Before proceeding to a description of the balance of the control circuits corresponding to block 56 in FIG. 1, it is first convenient to describe the format of the data block control word appearing as the second word in each message block. The 8-bit control word is divided up into four fields of 2 bits each. These fields are assigned in accordance with Table I.

TABLE I

Data Block Control Word Format

| Bit position | Bit I D. | Description |
|---|---|---|
| SRA8 | H2 | |
| SRA7 | H1 | Hog Prevention Control Field HC |
| SRA6 | | |
| SRA5 | | Not Used |
| SRA4 | LC2 | |
| SRA3 | LC1 | Loop Vacant-Full Control Field LC |
| SRA2 | TC2 | |

TABLE I-continued

| Data Block Control Word Format | | |
|---|---|---|
| Bit position | Bit I D | Description |
| SRA1 | TC1 | Type of Message Control Field |

Figure 8:
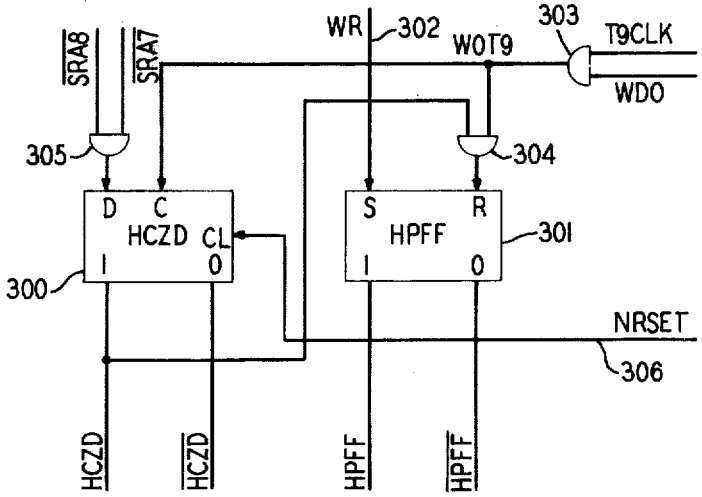
FIG. 8 is a detailed circuit diagram of a hog prevention control circuit useful in the control circuits of FIG.

In FIG. 8 there is shown a detailed circuit diagram of the logical arrangement necessary to prevent the monopolization of a local loop by one or more pairs of transmitting-receiving B-stations. This problem is referred to as "hog prevention" and arises because the stations intervening between a transmitting and a receiving station can be locked out of access to the circuit if the transmitting station presents a continuous load to the transmission loop. In general, the hog prevention circuits set a marker at a transmission station at the time of each transmission and prevent that station from initiating further transmissions until all other stations have satisfied their transmission requirements.

The hog prevention control circuit of FIG. 8 comprises an HC field zero detection flip-flop 300 and a hog prevention flip-flop 301. Flip-flop 301 is set by a signal on lead 302 each time the local station writes a message block into the loop. Flip-flop 301 is reset during the T9 clock pulse interval of word WDO as determined by the output of AND gate 303, providing flip-flop 300 is in the "1" state to complete the enablement of AND gate 304.

Flip-flop 300 is set to the "1" state by the simultaneous appearance of zeroes in the seventh and eighth bit positions of shift register A as determined by AND gate 305. These bit positions correspond to the hog control field HC of the data block control word as it resides in shift register A. Flip-flop 300 can be set only during the appearance of an output from AND gate 303 (during the T9 clock pulse interval of word WDO). Flip-flop 300 can be reset by an NRSET signal on lead 306, indicating a detection of a new start-of-block synchronizing signal. Flip-flop 300 is thus reinitialized for each new message block. The operation of a circuit of FIG. 8 will be discussed in more detail hereinafter in connection with the overall hog prevention system.

In FIG. 9 there is shown a detailed circuit diagram of the control circuits responsive to the loop control field LC and the type control field TC. The circuit of FIG. 9 comprises a pair of flip-flops 350 and 351 which respond to the loop control field in bit positions SRA4 and SRA3, respectively, appearing on leads 352 and 353. The outputs of flip-flop 350 and 351 are applied to a loop control field decoder 354. Decoder 354 may comprise a simple AND gate matrix to decode the loop control field bits into one-out-of-four control signals. These signals are described in Table II.

TABLE II

| Loop Vacant/Full Control Signals | | |
|---|---|---|
| Binary | Logical | Description |
| 00 | VCC | Block Vacant |
| 01 | FCC1 | Block Full; A-Station not passed |
| 10 | FCC2 | Block Full; A-Station passed once |
| 11 | FCC3 | Block Full; A-Station passed twice |

The flip-flops 355 and 356 are used to store the type control field appearing on leads 357 and 358, respectively, from the last two stages of shift register A. All of flip-flops 350, 351, 355 and 356 are enabled only during the appearance of a T9 clock pulse during a word WDO, as determined by the output of AND gate 359. All of flip-flops 350, 351, 355 and 356 are reset by an NRSET signal on lead 360 at the beginning of each new message block. The type control field bits are interpreted as shown in Table III.

TABLE III

| Type of Message Control Field | | |
|---|---|---|
| Binary | Logical | Description |
| 00 | LPM | Private Message |
| 01 | LCM | Common Message |
| 10 | UFM1 | Undeliverable Foreign Message |
| 11 | UFM2 | Undeliverable Foreign Message — FS and FD Interchanged |

In FIG. 10 there is shown a detailed logic diagram for the read-write control circuits forming a part of block 56 in FIG. 1. The gates of FIG. 10 implement the logical equations to be described below.

READ A PRIVATE MESSAGE FROM THE BLOCK

In order to read a private message appearing on the local loop, AND gate 375 implements the following logical equation:

$$RDP=RDRQ \cdot TDAD \cdot \overline{VCCD}. \quad (1)$$

The logical term RDRQ is read request from the local data utilization circuits. The TDAD signal is derived from FIG. 7 and indicates that the destination of the message on the loop is the local B-station. The logical term $\overline{VCCD}$, derived from FIG. 9, indicates that the message block is not vacant but indeed does carry a message. The concurrence of these conditions or logical signals provides an output from gate 375 and also provides an output from OR gate 376. These output signals perform the following functions. The contents of the loop and type control fields are gated out to the local data utilization circuits as the control word output (CWOT) bits as shown in FIG. 13. The corresponding positions in shift register B are set to zero. In addition, the source code in the fourth word position of the message block is also gated to the local data utilization circuits. Finally, all of the data bits from the message block are also gated to the local utilization circuits.

READ A COMMON MESSAGE FROM THE BLOCK

Gate 377 implements the following logical equation:

$$RDC=CRRQ \cdot LCMD \cdot \overline{VCCD}, \quad (2)$$

where $$LCMD=TC1D \cdot \overline{TC2D}. \quad (3)$$

The common read request signal CRRQ is provided by the local station and indicates a readiness to receive the common message. The inverted vacant control code detected signal VCCD is identical to that described with reference to equation (1). The local common message detected signal LCMD is defined in equation (3). The output of gate 377 is also applied to OR gate 376. As a result of these outputs, the command word output (CWOT) bits, the loop source code, and the data bits are all gated to the local station. The message block, however, is in this case left unaltered to permit the delivery of the common message to other stations on the loop on a broadcast basis.

WRITE A MESSAGE INTO THE BLOCK

Gate 378 in FIG. 10 implements the following logical equation:

$$WR=WRRQ \cdot ENWR \cdot VCCD, \quad (4)$$

where $$ENWR=HCZD+\overline{HCZD} \cdot \overline{HPFF}. \quad (5)$$

The logical term WRRQ is derived from the local station and indicates a desire to write a message into the local loop. The VCCD signal indicates that the message block is empty and hence available for writing. The ENWR signal, as indicated in equation (5), is a special enabling signal which permits writing only if the special hog prevention conditions exist. Thus the term HCZD indicates that the hog prevention control field is all zeroes, and hence no unsatisfied write request have been made previously on the loop. The second term of equation (5) indicates that writing is enabled even if zeroes were not detected in the hog prevention control field, provided that the hog prevention flip-flop 301 (FIG. 8) has not been set. This latter term indicates that the previous message on the loop was not inserted by this station.

The complete enablement of gate 378 provides a signal on lead 379 which sets the loop control field to "01," indicating the FCC1 condition which marks the block as being full. At the same time, the type control field is set by locally supplied bits (FLCI), identifying the type of message being transmitted. During successive word times this control word, a destination code, a source code and the data words are all written into shift register B (FIG. 6). As discussed in connection with FIG. 8, the hog prevention flip-flop 301 is also set.

In FIG. 11 there is shown a detailed circuit diagram of the write logic circuits corresponding to block 59 in FIG. 3. The write logic circuits comprise a plurality of write leads 400 through 407 which are supplied to shift register B, as shown in FIG. 6. Each of these leads can be enabled by the output of the connected one of OR gates 467 through 474, respectively. The outputs of each of OR gates 467 through 474 may be driven to the logic "1" state by the enablement of any one of a plurality of logical AND gates to which it is connected.

A wired source code identifying the local station is delivered by way of cable 410 to AND gates 411 through 418. When completely enabled by a signal on WSSR bus 419, gates 411 through 418 deliver the source code through OR gates 467–474 to leads 400 through 407 to be registered in shift register B. Similarly, data words appearing on cable 420 are supplied to AND gates 421 through 428. When completely enabled by a signal on INSR bus 429, gates 421 through 428 deliver data words via OR gates 467–474 to the leads 400 through 407, respectively, for registry in shift register B.

The data block control words are generated in command word encoder 465 at the left side of the wired matrix of FIG. 11. Gates 430, 431 and 432, for example, generate the hog control field bits which are inserted on leads K7 and K8 in response to the WD1 pulse on lead 433. These hog control bits are normally merely reinserted from the seventh and eighth bit positions of shift register B on leads 434 and 435, respectively. The eighth bit position, however, can also be filled by the output of AND gate 430, derived from inhibit gate 436. Gate 437 is enabled by a write request WRRQ signal on lead 437 and is disabled by a block vacant VCCD signal on lead 438. As will be discussed in more detail hereinafter, gate 436 writes a "1" into the H2 bit position to indicate that the local station wishes to write a message but cannot do so because the block is not vacant.

The foreign-local control word input (FLCI) bits are introduced at gates 439 and 440. These gates are enabled by the output of AND gate 441 during the word WD1 interval as indicated by a signal on lead 433, and during a write operation, as indicated by a signal on lead 442. The output of gate 441 is also used to write a "1" into the third bit position of the control word corresponding to the TC2 bit. This forces the loop control field to the "01" state, indicating that the block is full.

Gating signals are provided to the word writing circuits of FIG. 11 from AND gates 443, 444, 445 and 446. The output of AND gate 443 on ESIN bus 447 enables serial input data to be written into a message block. Gate 443 is partially enabled, via OR gate 448, during the third word interval for the destination code and during the fifth and following word intervals for writing data. An ESWR signal is also required on lead 449, indicating that the local station wishes to write in a serial fashion. The enablement of gate 443 is completed by a WR write signal on lead 442.

AND gate 444 provides the WSSR gating signal on bus 419 and is enabled during the third word period for write operations to gate the wired source code in parallel into shift register B.

Gate 445 provides an output INSR signal on bus 429 for gating data in parallel into shift register B and is enabled during the second and fourth word periods by the output of OR gate 450.

Gate 446 provides an output BSCW signal on bus 451 during the word WD1 interval indicating that a command word is being written into shift register B. Gate 446 is fully enabled by a "private" read request on lead 452 or a write request on lead 442, both of which are applied through OR gate 466.

The local data source is provided with strobing signals on leads 453 and 454. The PWSTB signal on lead 453 is provided by gate 455 during the T9 clock interval and during parallel input as indicated by an INSR signal on bus 429. The SWSTB strobe on lead 454 is supplied by gate 456 to which there is applied an ESIN signal from bus 447, a clock pulse from lead 457 and a T9 pulse from lead 458, inverted in inverter circuit 459. Lead 454 is therefore energized during the entire word interval and is not energized during the guard space.

Referring to FIG. 12, there is shown a detailed logic diagram of a command word encoder suitable for use as encoder 465 in the write logic circuit of FIG. 11 when FIG. 11 is used for an A-station. The encoder of FIG. 12 comprises an AND gate 500 to which there is applied an FCC2D signal on lead 501 from the loop control decoder of FIG. 9 and a word WD2 pulse on lead 502. As can be seen in Table II, the FCC2D signal indicates that the full message block has passed the A-station once and hence has circulated entirely around the loop without being delivered. During the second word interval, gate 500 is fully enabled to produce an ICSD signal at output lead 503, indicating that the source and destination codes should be interchanged so as to return message block to its source. This returning block then indicates that the destination is busy or otherwise unavailable for delivery of the message.

The hog prevention scheme requires that the A-station substitute the H2 bit for the H1 bit and set the H2 bit to zero. To this end, gate 504 is used to gate the control word bit from the 8th bit position (H2) on lead 505 into the seventh bit position (H1) on lead 506. Gate 504 is fully enabled during the word WD1 interval during which the command word is written into shift register B (FIG. 6).

The loop control field and type control field are also written during the word WD1 interval as determined by the output of gate 507 on ASCW bus 508. Gate 507 is disabled by a WR signal on lead 509 or a BSCW signal on lead 512 and is enabled by a word W1 pulse. When fully enabled, gate 507 provides an output to gates 513, 514, 515 and 516. At this time, gates 514 and 515 gate the type control field from FIG. 9 into shift register B. At the same time, the loop control field is written into the LC2 (K4) and LC1 (K3) positions of the code word. The FCC2D signal on lead 517 is gated directly to the Lc1 (K3) bit position and the FCC1D and FCC2D signals are ORed in gate 510 and gated to the IC2 (K4) bit position. The signal on line 508 is applied to OR gate 518 along with an FCC3D signal to produce an ASCW signal on lead 519.

The logic of FIG. 12 implements the following rules for station busy situations:

1. If the detected loop control field is "01" (FCC1D), indicating that the block is full and that the A-station has not yet been passed, set the loop control bits to "10" (FCC2) to now indicate that the A-station has been passed once.

2. If the detected loop control field is "10" (FCC2D), indicating that the block is full and that the A-station has been passed once, then set the loop control field to "11" (FCC3) to indicate that the A-station has been passed twice.

3. If the detected loop control field is equal to "11" (FCC3D), indicating that the A-station has been passed twice, set the loop control field to "00" (VCC), indicating that the block is now vacant.

It can be seen that these logic rules keep track of the length of time that undelivered message blocks remain in the loop. After circulating around the loop twice without being delivered, the message block is returned to the sender, indicating that it has not been delivered. This is accomplished simply by exchanging the source and destination codes. A message which passes an A-station with an FCC3D code is erased, thus preventing loop blocking by unwanted messages.

FIG. 8, in combination with gates 500 and 504 of FIG. 12, and gates 436, 430, 431 and 432 in FIG. 11, implements the following strategy for hog prevention;

1. When a B-station writes a message, the hog prevention flip-flop (HPFF) in that station is set to "1" (FIG. 8) and the HC field is circulated on the loop unmodified (FIG. 11).

2. If any other B-station on the loop wishes to write a message (WRRQ) when a full block is detected, the HC2 bit of the hog prevention control field is set to "1" (gate 430 in FIG. 11).

3. If a B-station detects a VCCD vacant block signal (gate 378 in FIG. 10) and:

a. if the HC field is "0," writing is independent of the state of HPFF flip-flop 301 (FIG. 8);

b. if the HC field is not "0," the B-station can write if, and only if, the HPFF flip-flop 301 is reset to "0."

4. When a data block passes an A-station (FIG. 12) the HC2 bit replaces the HC1 bit and the HC2 bit is set to "0."

5. The HPFF flip-flop 301 for each B-station is reset when HC1 and HC2 are both "0" (gate 305 in FIG. 8).

It can be seen that the above logic scheme prevents line blocking since, after a B-station sends a message, it is prevented from sending another message until all other requests on the line are serviced.

In FIG. 13 there is shown detailed logic circuitry for the read logic circuit 62 in FIG. 3. The circuit of FIG. 13 comprises a set of four leads 520 taken from flip-flops 350, 351, 355 and 356 of FIG. 9. Signals on these leads represent the received loop and type control fields which are delivered to the local data utilization circuits as command words CWOT1 through CWOT4. The parallel outputs of shift register B (FIG. 6) are delivered on leads 521 to the local data utilization circuits. The local data utilization circuits are also provided data strobing signals on leads 522 and 523 to time parallel reading (on lead 522) and serial reading (on lead 523) of the received data. Signals on leads 522 and 523 are derived from AND gates 524 and 526, respectively.

Word pulses during the third and fourth word intervals are combined in OR gate 526 and supplied to each of AND gates 524 and 525. A read pulse on lead 527 is also delivered to gates 524 and 525. A clock pulse on lead 528 is also delivered to AND gates 524 and 525. Finally, a T9 pulse is delivered during the guard interval to gate 524 to permit parallel gating during the guard interval, and, after inversion in inverter 530, is applied to gate 525 to permit serial reading during the word interval itself.

In FIG. 14 there are shown data output circuits useful in the station circuit of FIG. 3. The output from shift register B in FIG. 6 appears on lead 550 in FIG. 14 and is applied to gate 551. Gate 551 is normally enabled and this output is applied by way of OR gate 522 to timing gate 553. When it is necessary to interchange the source and destination codes during the WD2 word interval, an ICSD signal appears on lead 554 from FIG. 12 to enable gate 555 and, by way of inverter 556, to disable gate 551. It can thus be seen that the destination code in shift register A and appearing on lead 557 is gated through gates 555 and 552 while the source code remains stored in shift register B. In the following word interval, the signal is removed from ICSD lead 554 and the source code can be read out of shift register B by way of gate 551. The interchange of source and destination codes is thereby achieved. T9 clock pulses on lead 558 inhibit gates 551 and 555 during the guard interval.

Data is serially inputed into the loop at gate 560. This data, appearing on lead 561, is enabled by an ESIN serial input enabling signal on lead 562. This enabling signal on lead 562 is also used to disable gate 551 during normal message forwarding. The T9 clock pulse on lead 558 also disables gate 560 during the guard interval.

Gate 563 is utilized to insert guard pulses into the guard pulse interval. To this end, T9 clock pulses on lead 558 are applied to gate 563. Gate 563 is fully enabled, however, only if there is no start-of-block code detected in FIG. 7 as indicated by a signal on lead 564. At the time the start-of-block code is detected and the flip-flop 260 in FIG. 7 is set, the ninth zero is inserted in the guard space by the disablement of gate

563.

During the last bit interval of the word preceding these nine "0's," as indicated by a signal on lead 565 from flip-flop 261 in FIG. 7, AND gate 566 becomes fully enabled to write a "1" into this last bit position of the word. This insures that the nine "0's" framing signal occurs unambiguously at the start of each message block.

The output of retiming gate 553 is applied to transmission converter 589 at the triggering input of flip-flop 567. The "1" and "0" outputs of flip-flop 567 are applied to AND gates 569 and 570, respectively. The output of AND gate 553 is also applied to AND gates 569 and 570, while the outputs of gates 569 and 570 are applied across the center-tapped primary winding off transformer 571.

The purpose of the transmission converter 589 is to convert the unipolar output pulses from gate 553 into bipolar pulses on output leads 572. Successive "1's" at the output of gate 553 set and reset flip-flop 567. AND gates 569 and 570 are therefore alternately partially enabled. The data pulses from gate 553 complete the enablement of gates 569 and 570 to drive transformer 571 alternately with signals of opposite polarity. Such signals are, of course, less likely to produce a direct current drift when transmitted on transmission line 572.

When the data output circuits of FIG. 14 are used in an A-station, a loop initialization circuit 573 is also provided and is inserted in series with line 590 at terminals 591. Loop initialization circuit 573 includes a format flip-flop 574 which is set by the SFLC output of OR gate 575. OR gate 575, in turn, is enabled by the output of gate 576 or by a signal on lead 577 from FIG. 4, indicating that the number of words in the data block have exceeded the specified value. Alternatively, AND gate 576 is enabled by the simultaneous appearance of signals on leads 578 and 592 and absence of a signal on lead 579, indicating that the number of words in the data block is less than required and no synchronization cycle is in progress. The signal on lead 578 is taken from FIG. 7 and indicates that the start-of-block synchronizing signal has been received. The signal on lead 579 is taken from FIG. 4 and indicates that the necessary number of words have not yet been received to make up a message block. The signal on lead 592 is taken from FIG. 7 and indicates that nine zeroes have been detected. Flip-flop 574 is therefore set to initiate a loop initialization sequence if the block length exceeds the fixed value (BLOV), or if a start-of-block signal is received before the desired block length is reached (BLUN). The SFLC signal on lead 592 is also used as the RBLC signal in FIG. 4 to reset block length counter 121 and thus initiate a new block count.

When set, flip-flop 574 enables AND gate 580 to allow clock pulses from pulse source 581 to be transmitted through OR gate 582 to message block register 583. In this way, the message block can be filled with "1's" for initialization. When the block length count again reaches BLOV, gate 584 is enabled during the T9 clock pulse interval and flip-flop 574 is reset. At the same time, the FGSYC signal on lead 586 is applied to reset flip-flop 261 in FIG. 7, initiating a start-of-block signal generation sequence.

Pulse source 581 may be a crystal oscillator and provides the basic timing for the entire local loop. Its pulse repetition rate is recovered and used for retiming purposes at each B-station on the loop. Register 583 is of sufficient size to prevent the message block from overloading the storage capacity of the loop. Register 583 may, for example, be large enough to contain an entire message block, in which case there will be a delay between message blocks equal to the overall transmission time around the loop. Register 583 may, however, be of a smaller size and the storage capacity of the loop itself be taken advantage of for storing portions of the message block.

Flip-flop 574 remains set so long as AND gate 584 is not enabled. AND gate 584 detects the next coincidence of a block length oversize (BLOV) signal on lead 577, a "1" output from flip-flop 574, and a T9CLK pulse on lead 585. When fully enabled, AND gate 584 provides an output on lead 586 which is used in FIG. 7 to reset the zero detecting flip-flop 261. When the output from AND gate 584 appears, this signal is used to reset flip-flop 574. At this time, flip-flop 574 enables AND gate 588 to pass the output of OR gate 552 through OR gate 582 to register 583. The output of register 583 is, of course, supplied to AND gate 553.

It can be seen that the operation of the loop initialization circuit 573 is to insert into the loop, via AND gate 580, a string of "1's" from pulse source 581. After a full block of "1's" has been inserted into the loop by way of gate 580, the block length counter 121 in FIG. 4 again reaches the value to energize BLOV lead 124 (FIG. 4), thus completing the enablement of AND gate 584 (FIG. 14) by way of lead 577. The FRMT format flip-flop 574 is therefore reset, terminating the insertion of "1's." At the same time, the FGSYC signal on lead 586 is applied to NCZD flip-flop 261 in FIG. 7, setting this flip-flop and causing an output to appear at lead 265. When the first "1" appears at the output of shift register A (SRAG) on lead 27, AND gate 269 becomes enabled to set SOBD flip-flop 260 and, on the next clock pulse, provides an SRSET pulse on lead 273. As can be seen in FIG. 6, this SRSET signal on lead 235 gates an all "0's" code into shift register B, providing the first eight "0's" of the SOB code. In FIG. 14, the AND gate 563 provides the ninth "0" by disabling the T9 pulse on lead 568 due to the setting of SOBD flip-flop 260 (FIG. 7) as described above. The B-stations on the loop are now able to use this message block as described above for writing messages which can thereafter be read by other stations.

In FIG. 15 there is shown a block diagram of a C-station suitable for use in the data transmission network of FIG. 1. The C-station of FIG. 15 comprises two B-stations 600 and 601. Each of B-stations 600 and 601 may be of a station circuit such as that disclosed in block form in FIG. 3 and in more detail in FIGS. 4 through 14. B-station 600 is interposed in one loop while B-station 601 is interposed in another loop.

B-station 600 delivers data to a buffer store 603 which, in turn, delivers data to B-station 601. Simiarly, B-station 601 delivers data to a buffer store 604 which, in turn, delivers that data to B-station 600. A controller 605 receives control signals from B-stations 600 and 601 and issues appropriate commands to buffer stores 603 and 604.

It can be seen that the C-station of FIG. 15 allows loop 1 and loop 2 to intersect in the sense that message blocks on loop 1 can be launched on loop 2 and message blocks on loop 2 can be launched on loop 1. This is accomplished by detecting destination codes such as those shown in FIG. 2B which indicate a destination on a different loop than the one on which the message is delivered. In response to such foreign codes, a message block is transferred by the appropriate ones of B-stations 600 and 601 into the connected one of buffer stores 603 and 604. As soon as a vacant message block is detected on the loop into which the message is to be launched, the buffer store delivers the message block to the appropriate B-station for insertion in the appropriate loop.

Buffer stores 603 and 604 may comprise different portions of the same memory and may have the capacity of several message blocks. Indeed, to prevent an undue number of message blocks from being lost, the size of buffer stores 603 and 604 is selected with due regard to the amount of interloop traffic to be expected. The entry of message blocks into buffer stores 603 and 604 and the removal of these message blocks from the buffer store are under the control of controller 605.

It should be noted that B-stations 600 and 601 need not be operating at the same pulse repetition rate nor in synchronism. Data is written into the buffer stores 603 and 604 under the control of timing signals from the B-station reading the message from the connected loop. Data is read from the buffer stores under the control of timing signals from the B-station at which the message is to be inserted into the connected loop. Since both B-stations are synchronized with their associated loops, a rate change is possible between the two loops. The multi-message block capacity of the buffer stores 603 and 604 permits any desired ratio between the rates in the two loops.

Referring to FIG. 16 there is shown a buffer store unit suitable for use in FIG. 15 and comprising a magnetic core matrix 610 including an array of magnetic cores and associated control conductors threading those cores, all in accordance with practices well known in the art. The magnetic cores of matrix 610 are addressed in accordance with conventional 2½D practice by coincident signals from X-selection matrix 611 and Y-selection matrix 612.

During the read cycle, a half-select current is driven on the selected line of X-matrix 611 and a half-select current is also driven on those ones of the lines of Y-matrix 612 in each bit position, forcing the selected magnetic cores 610 to the "0" state. During the write cycle, a half-select current is driven on the selected line of X-matrix 611 and a conditional additive half-select current is applied to the selected lines of Y-matrix 612 in each bit position to force the core to the "1" state. The conditional additive current is applied selectively to the Y-matrix 612 lines in each bit position by way of the Y-shunt switch 621. Since data is inserted into each bit position of a selected word by logically or conditionally selecting an additive half-select current, an independent Y-matrix 612 must be used for each bit position of the memory.

These selection matrices 611 and 612 are, in turn, driven by X-drivers 613 and Y-drivers 614, respectively. The drivers 613 and 614 receive address information from address decoder 615 which, in turn receives the memory address from address register 616. These addresses are, of course, supplied to the store unit of FIG. 16 from store accessing circuits in the controller 605 in FIG. 15.

Information stored in magnetic core matrix 610, and which is addressed from matrices 611 and 612, produces outputs representative of the binary information stored in the addressed location of matrix 610. These signals are detected by sense amplifiers 619 and the binary information is stored in data register 620. The data is delivered from register 620 to the C-station controller by way of leads 624.

When it is desired to store information in the buffer store unit of FIG. 16, this input data is delivered by way of leads 625 and stored in data register 620. At the same time, address signals are delivered to address register 616, indicating the precise location in which the input data is to be stored. The information previously stored at the addressed location in the magnetic cores 610 is first read from the magnetic cores 610, resulting in the destruction of that information. The resulting signals are not detected by the sense amplifiers 619 for this case. The input data stored in data register 620 is delivered by way of the Y-shunt switch 621 to the magnetic core matrix 610 in synchronism with the address control signals generated by address decoder 615, drivers 613 and 614 and selection matrices 611 and 612. In this way, input data is stored in matrix 610 for later retrieval.

Referring more particularly to FIG. 17A, there is shown a write controller circuit which forms part of the controller 605 in FIG. 15. The write controller of FIG. 17A is suitable for controlling the writing of message blocks into either of the buffer stores 603 or 604. Thus, two write controllers such as that as shown in FIG. 17A are provided, one for each of the buffer stores 603 and 604.

The write controller of FIG. 17A comprises a byte counter 700 which counts the number of 8-bit bytes contained in each word of the magnetic core memory of FIG. 16. A word length of 48 bits, for example, will provide room for six 8-bit bytes. These bytes are delivered by way of cable 701 to the bank of AND gates 702. Byte counter 700 recycles after each full byte count, emitting an overflow pulse on lead 703. The contents of counter 700 are decoded in byte decoder 704 and are used to enable the identified gate of the bank of AND gates 702.

In operation, byte counter 700 is advanced by the output of AND gate 705 to which there is applied an RD pulse, indicating the presence of a message block to be read from the sender loop, and a T9 clock pulse appearing during the guard space between the bytes. Counter 700 counts these byte signals and, by way of decoder 704, writes the bytes into the appropriate portions of write data register 706. Thus, register 706 assembles these bytes into a full memory word. When a memory word is fully assembled, an overflow signal on lead 703 is supplied to write flip-flop 707 to set flip-flop 707 to the "1" condition. This "1" output on lead 708 is applied to one input of AND gate 709, the other input of which is derived from lead 710. The signal on lead 710 is drived from the timing and control circuits 626 in FIG. 16 and indicates that a reading cycle has been completed and the memory is now available for writing.

When fully enabled, AND gate 709 enables gate 711 and resets write flip-flop 707. AND gate 711 gates the data word from register 706 to the buffer store of FIG. 16 for storage in the magnetic core matrix.

The overflow output from counter 700 on lead 703 is also applied to the word counter 712, which counts the number of magnetic core memory words necessary to make up a message block. After arriving at this count, counter 712 produces an overflow signal on lead 713, which is applied to block counter 714. Block counter 714 is arranged to count to the maximum number of message blocks to be stored in one of the buffer stores 603 or 604 in FIG. 16. This number, of course, corresponds to the maximum amount of message buffering required to prevent overloading during peak traffic periods.

The word count in counter 712, together with the block count in counter 714 together comprise an address suitable for accessing the buffer store shown in FIG. 16. This address is read out by way of gate 716, enabled by the output of AND gate 709, and is also supplied to the buffer store circuits of FIG. 16.

The message bit leads 701 correspond to leads 521 in FIG. 13 and are taken in parallel from shift register B as shown in FIG. 6. The RD signal applied to AND gate 705 is derived as shown in FIG. 10 with the following provisos. The RDRQ read request signal is always on, since the buffer stores are always ready to accept message blocks. The TDAD Terminal Destination Address Detected signal applied to gate 375 in FIG. 10 is derived as shown in FIG. 7. For C-station write control, however, the AND gate 274 is cross-wired to detect the next higher level loop address. In this way, all messages on the lower level loop which are not intended for ultimate delivery to that lower level loop are written by the C-station into its buffer storage unit.

In FIG. 17B there is shown a read controller circuit also suitable for use as part of controller 605 in FIG. 15. The read controller of FIG. 17B is identical in all respects except the direction of data transfer to the write controller of FIG. 17A. For that reason, corresponding elements have been identified with the same reference numeral, but with a prime added. Thus, byte counter 700′ is advanced by the output of AND gate 705′ to which WR write signals and T9 clock pulse signals are applied. The contents of byte counter 700′ are decoded in byte decoder 704′, the outputs of which are used to selectively enable AND gates 702′ to gate the contents of read data register 706′ to leads 701′.

The overflow output of byte counter 700′ on lead 703′ is applied to read flip-flop 707′ and to word counter 712′. When set, flip-flop 707′ partially enables AND gate 709′ which is fully enabled by a "memory available" signal on lead 710′. The output of AND gate 709′ resets flip-flop 707′ and enables gates 711′ and 716′.

The signal on lead 703′ is also applied to word counter 712′, the overflow output of which is applied to block counter 714′. The work count and block count, together make up the read address which is gated to the buffer store by way of gate 716′.

If all of the counters of FIGS. 17A and 17B are started out in the all "0's" condition, then successive incoming message blocks will be written into the buffer store by the write controller of FIG. 17A in regular sequence. When the memory is full, the block counter 714 recycles to "0" and begins writing message blocks into the previously used storage positions. Meanwhile, the read controller of FIG. 17B reads these message blocks from the buffer store in the same sequence as they are written into the buffer store. The block counter 714′ also recycles to begin reading messages from the initial storage positions. Messages are read out onto the receiving loop as fast as vacant blocks become available at the C-station.

The C-stations perform their switching functions in accordance with the following rules. The local, regional, and national destination codes are stored as shown in FIG. 2B.

1. A message block on a local loop is transferred to a regional loop if its destination code is different from the local loop which it is on.

2. A message block on a regional loop is transferred to the national loop if its regional destination is different from the regional loop it is on.

3. A message block on the national loop is transferred to the regional loop which corresponds to the national destination code in the message block.

4. A message block on a regional loop is transferred to a local loop when the regional destination is the same as the local loop.

5. A message block on a local loop is transferred to the B-station having the destination code corresponding to the local destination in the message block. If these rules are followed, all messages will be delivered to the appropriate destinations. In order to accommodate these rules and utilize the detailed circuitry of FIGS. 4 through 14, it is necessary that the various C-stations find the appropriate destination code in the "Current Destination" (CD) word slot, i.e., the third word (WD2) of the message block. In FIG. 14A there is shown an address repositioning circuit which will, with the proper values of the circuit components and with the proper timing signals, copy the source and destination codes from the fifth through the tenth word positions of the message block (FIG. 2B) to the third (CD) word position. A circuit such as that shown in FIG. 14A can be included in the Data Output Circuits of FIG. 14 at connection points 591 instead of the Loop Initialization Circuit 573. Indeed, a separate address repositioning circuit is included in each B-station portion (FIG. 15) of each C-station. Thus, one address repositioning circuit is used for outbound traffic (from a lower level loop to a higher level loop) and one address repositioning circuit is used for inbound traffic (from a higher level loop to a lower level loop).

In FIG. 14A there is shown an address repositioning circuit comprising a delay or storage circuit 950 connected to BDAT line 590 (FIG. 14) and delivering its output to an inhibit gate 951. Delay circuit 950 may comprise a shift register such as those shown in FIGS. 5 or 6, or may comprise any other type of digital delay circuitry. The amount of delay or number of stages of delay circuit 950 depends on the specific location of the circuit and will be taken up below.

The ouput of inhibit gate 951 is connected to line 954 which, in turn, is connected to gate 553 in FIG. 14. The BDAT input lead 590 to delay circuit 950 is also connected to AND gate 952, the output of which is connected to output line 954. both of gates 951 and 952 are under the control of control signals on lead 953 which simultaneously disable gate 951 and enable gate 952. The net effect of the circuit of FIG. 14A, therefore, is to reorder the digital signals such that those signals about to enter delay circuit 950 are inserted prior to the signals about to leave delay circuit 950. As previously noted, if the amount of delay and control signal timing are properly adjusted, the circuit of FIG. 14A can be used to reposition addresses.

Returning to FIG. 15, it should be recalled that each C-station interconnects a lower level loop with a higher level loop. The B-stations which form part of the C-station thus intersect with the lower level loop and the higher level loop. All address repositioning takes place in one of the B-station portions of the C-station prior to storage on the Buffer Stores 603 and 604. The B-station in the lower level loop provides address repositioning for outbound message blocks while the B-station in the higher level loop provides address repositioning for inbound message blocks. The specific repositionings will be taken up by considering the transmission of a typical message block through the entire transmission system of FIG. 1.

At the local B-station at which the message block originates, the message block source writes the address of the local C-station into the "Current Destination" (CD) word position of the message block, FIG. 2B (as well as in the "Regional Source" word). This C-station address is, of course, the address of the C-station in the same local loop as the originating B-station, and is the only access port from the local loop to the overall network.

When the message arrives at the local C-station so identified, the message block is picked off the local loop and stored in the buffer store. Before such storage, however, the outbound B-station portion of the C-station overwrites the "National Source" code (the eighth word) into the "Current Destination" word. This "National Source" code, of course, identifies the C-station giving that regional loop access to the national loop. As can be deduced from FIG. 2B, this repositioning of the address code requires a move of five word lengths. The digital delay circuit 950 of FIG. 14A therefore must provide a delay of five word lengths. Moreover, since the "National Source" code appears in the eighth word slot, a timing pulse occurring during this time slot is required on lead 953. As can be deduced from FIG. 4, this timing pulse is a WD7 pulse which can be generated by decoder 117 in response to the word counter outputs. Thus, the inward-facing B-station portion of this C-station is equipped with a circuit such as that shown in FIG. 14A wherein the delay of circuit 950 is five word intervals, and the timing pulse on lead 953 occurs during the eighth word interval.

In response to this "National Source" code, the message block is intercepted by the C-station giving access to the national loop. The inward-facing B-station then substitutes the "National Destination" code into the "Current Destination" word slot, using a circuit such as that of FIG. 14A, but with the delay equal to two word lengths and the timing pulse in the WD4 time slot.

In response to this "National Destination" code, the message block is intercepted by the C-station giving access to the desired regional loop. In this case, the outward-facing B-station substitutes the "Regional Destination" code in the Current Destination time slot using an address repositioning circuit as shown in FIG. 14A with D equal to three word lengths and a WD5 timing pulse.

The C-station at the desired local loop responds to this "Regional Destination" by intercepting the message block. The outward-facing B-station then substitutes the "Local Destination" code in the Current Destination time slot using a delay of four word intervals and a WD6 timing pulse.

In order to interchange source and address codes for foreign messages, it is necessary to interchange three words (national, regional, and local codes) rather than one word. The address repositioning circuit of FIG. 14A can also be used for this purpose. The delay is selected for three word intervals and a timing pulse, sustained for three word periods is supplied to lead 953, beginning at WD7 and continuing through WD9. At the same time, the new "Regional Source" code (previously the "Regional Destination" code) must be placed in the Current Destination word slot. A separate circuit of FIG. 14A can be used with D equal to six word lengths and a timing pulse at WD8. Alternatively, the two circuits can be combined, concatenating two three-word delay circuits and using alternate delay bypassing gates.

The transmission system described with respect to FIG. 1 does not provide alternative routing, but channels all traffic between different regional loops and their various local loops through the national loop. In some cases, however, there may often be very heavy traffic between particular pairs of regional or local loops. To accommodate this situation, a special trunk loop, as illustrated in FIG. 18, may be provided. Thus, the higher level national or regional loop 901 includes C-stations 902 and 903. C-station 902 interconnects with a lower level loop 904, while C-station 903 interconnects with a lower level loop 905.

If it is assumed that such large amounts of traffic must be transmitted between loops 904 and 905 that an undue burden might be placed on higher level loop 901, a special trunk loop 906 may be provided to permit traffic to move between loops 904 and 905 without utilizing higher level loop 901. Thus, C-station 907 interconnects loop 904 with trunk loop 906, while C-station 908 interconnects loop 905 with trunk loop 906. It should be noted that the C-stations 907 and 908 are located in their respective loops before, i.e., messages are received earlier than, the C-stations 902 and 903 connecting the lower level loops 904 and 905 to the higher level loop 901. The C-stations 907 and 908 therefore remove the trunk traffic to the other lower level loop before it can be switched onto the higher level loop 901.

The transmission system of FIG. 1 also does not take into account the possibility that a higher level loop may fail, thus blocking large amounts of traffic. In FIG. 19 there is shown one method of alternate routing should a higher level, in this case, the national loop, fail. In FIG. 19 the national loop 901 includes C-stations 911 and 912 for interconnection to regional loops 913 and 914, respectively. An alternate loop 915 interconnects regional loops 913 and 914 at C-stations 916 and 917, respectively.

It can be seen that the alternate loop 915 of FIG. 19 provides an alternative path for traffic just as does trunk loop 906 in FIG. 18. In FIG. 19, however, the C-stations 916 and 917 for gaining access to this alternate route are located after, i.e., messages are received later than, the C-stations 911 and 912 in their respective regional loops. Thus, C-stations 916 and 917 are utilized only if the traffic has not already been switched at C-stations 911 and 912, respectively. Such alternate loops interconnecting regional loops provide alternative routing for messages which would otherwise use the national loop. These alternate loops are used automatically whenever traffic is unable to gain access to the national loop simply because such messages would then be passed on to the alternate loop C-stations.

Another way of increasing the reliability of the overall system of FIG. 1 is illustrated in FIG. 20. In FIG. 20, the national loop and the regional loops are made double and are redundantly interconnected as shown. Thus, the national loop comprises double loops 920 and 921, while the regional loop includes redundant loops 922 and 923. Each pair of loops are interconnected by C-stations. Thus, loops 920 and 922 are interconnected by C-stations 924; loops 920 and 923 by C-station 925; loops 921 and 922 by C-station 962; and loops 920 and 923 by C-station 927.

When interconnected as shown in FIG. 20, one of the two redundant loops is used in preference to the other until a failure occurs. Such a failure, for example, involving C-station 927 between loops 921 and 923, prevents message interchange at that point and allows these messages to pass on to C-station 925 or C-station 926, depending on which of the initially used loops 921 or 923 had failed. The local loops can also be made double whenever the traffic warrants it. Each of the C-stations in such redundant circuits is equipped with an automatic switch to bridge the C-station data path and thus complete the loop in case of C-station failure.

It is to be understood that the above-described arrangements are merely illustrative of the numerous and varied other arrangements which may constitute applications of the principles of the invention. Other loop structures, for example, not involving hierarchial relationships can be used if appropriate addressing is utilized. Such other arrangements may readily be devised by those skilled in the art without departing from the spirit or scope of the present invention.

What is claimed is:

1. A transmission system for transmitting multi-word message blocks of digital data comprising at least three intersecting transmission loops, each said loop including a plurality of substantially identical autonomous stations responsive only to availability and destination control signals indicating the availability and destination of said message blocks, respectively, said control signals being placed on said loop by any of said autonomous stations for respectively writing message blocks onto and for reading message blocks from that loop, and a message block switching station at each intersection of said loops, said switching stations each comprising buffer storage means for storing a plurality of said message blocks, selection means responsive only to said destination control signals for selecting message blocks to be transferred to an intersecting loop, means for writing the selected message blocks from one of said selected loops into said buffer storage means at the time of arrival thereof, and means for reading message blocks from said buffer storage means onto the other one of said intersecting message loops in response to said availability control signals on said other one of said loops.

2. The transmission system according to claim 1 further comprising an alternatively usable loop between two loops intersecting the same common loop, and message block switching means for interconnecting said alternatively usable loop to said two loops to switch message blocks between said two loops without said message blocks traversing said common loop.

3. The transmission system according to claim 1 further comprising at least one redundant loop interconnecting the same stations as one of said transmission loops, and at least one spare station of said message block switching stations interconnecting said redundant loop to an intersecting one of said transmission loops.

4. A distributed control, loop transmission system for digital data message blocks comprising at least three closed transmission loops, a plurality of substantially identical autonomous stations on each of said loops, each of said autonomous stations including means responsive to availability signals indicating the availability of said message blocks and placed on the connected one of said loops by any one of said autonomous stations for writing a digital message on that loop in an available message block, and means responsive to destination signals indicating the destination of the data in said message block and placed on the connected one of said loops by any one of said autonomous stations for reading a digital message block from that loop, and buffer storage means connected between two of said autonomous stations on different ones of said loops to interconnect the corresponding loops for exchange of digital message blocks therebetween by allowing the data received from one loop to be transmitted in a message block of another loop when the availability signals in said other loop indicate an available message block.

5. A distributed control, loop transmission system according to claim 4 further comprising a resynchronizing unit in each of said transmission loops for closing each of said loops on itself.

6. A distributed control, loop transmission system according to claim 4 wherein said means for writing digital message blocks comprises a shift register in series with said transmission line, detection means responsive to signals in said register for identifying digital message block starting times, and means responsive to said detection means for writing data into said shift register.

7. A distributed control, loop transmission system according to claim 4 wherein said closed transmission loops include a plurality of lower level loops each interconnecting a plurality of said stations, and at least one higher level loop interconnecting all of said lower level loops.

8. A distributed control, loop transmission system according to claim 7 including at least three levels of interconnecting loops, each higher level loop interconnecting a plurality of lower level loops, and a single highest level loop interconnecting a plurality of next lower level loops.

9. A distributed control, loop transmission system according to claim 7 comprising a bypassing transmission loop interconnecting two of said lower level loops to permit communication between said two lower loops without traversing said higher level loop, and bypass buffer storage means interconnecting one of said stations on said bypassing transmission loop with stations on said two lower level loops.

10. A distributed control, loop transmission system according to claim 9 wherein said bypass buffer storage means is connected to said one station to intercept messages prior to their delivery to said higher level loop.

11. A distributed control, loop transmission system according to claim 9 wherein said bypass buffer storage means is connected to said one station to intercept messages after their attempted delivery to said higher level loop.

*12. A communication system comprising:*

*a closed master transmission loop;*

*a system control means that operates in discrete cycles, said master control means producing first and second framing characters at the beginning of each cycle;*

*an interface means connected to said system control means and said master loop, said interface means including a switch connected in said loop master for transferring said first and second framing into said master loop for tranmission around said master loop;*

*a plurality of transmission sub-loops, each of said being connected to said master loop by a first interface connected to said master loop, each having a sub-loop control unit connected to said first interface, and a second interface connected to said sub-loop control unit and to a separate transmission sub-loop;*

*each of said transmission sub-loops having a plurality of stations connected thereto, said stations being operable to transmit and receive digital messages;*

*each of said sub-loop control units having a first storage means for storing messages to be transmitted from its associated sub-loop and a second storage means for storing messages to be received by its associated sub-loop;*

*a first one of said sub-loop control units being responsive to said first and second framing characters to permit transmission of messages from its first storage means onto said master loop and concurrently producing a third framing character to prevent transmission from the other sub-loop control units.*

*13. A communication system according to claim 12 wherein each of said interfaces includes a receive register connected to said master loop on one side of the said switch therein and a transmit register connected to the master loop on the other side of said switch;*

*a decoder connected to said receive register for detecting and producing signals upon the receptors of said first, second and third framing characters;*

*a storage means connected to said transmit register for providing first, second and third framing characters to said transmit register;*

*and control means connected to said decoder means and said storage means for controlling the sequence of operation thereof.*

*14. A communication system according to claim 12 wherein each of said sub-loop control units inlcudes means for receiving messages from said interface connected to said master loop;*

*means for storing said messages from said master loop for one cycle of operation;*

*and means for thereafter transmitting said messages from said master loop through said interface connected to said sub-loop;*

*means for receiving messages from said interface connected to said sub-loop;*

*means for storing said messages from said sub-loop for one cycle of operation;*

*and means for thereafter transmitting said messages from said sub-loop through said interface connected to said master loop and onto said master loop.*

* * * * *

UNITED STATES PATENT AND TRADEMARK OFFICE

CERTIFICATE OF CORRECTION

PATENT NO. : Re 28,811

DATED : May 11, 1976

INVENTOR(S) : John R. Pierce

It is certified that error appears in the above-identified patent and that said Letters Patent are hereby corrected as shown below:

Column 1, line 54, change "provide" to --improve--. Column 5, line 1, change "this" to --This--; line 31, change "clock" to --block--. Column 6, line 26, change "be" to --the--; line 34, change "from" to --form--. Column 8, line 25, change "desired" to --described--. Column 9, line 40, change "inputs" to --outputs--; line 63, change "more" to --while--. Column 11, last line in Table I, after "Type of Message Control Field" insert --TC--. Column 14, line 1, change "437" to --436--; line 67, after "return" insert --the--. Column 17, line 16, change "off" to --of--. Column 18, line 56, change "simiarly" to --similarly--. Column 27, claim 12, line 12, change "master" to --system--; line 13, change "framing" to --control--; line 16, change "loop master" to --master loop--; line 17, change "framing" to --control characters--; line 19, after "said" insert --subloops--; line 35, change "framing" to --control--. Column 28, claim 13, line 11, change "producing" to --delivering--, change "upon" to --to--; line 12, change "framing" to --control--; line 14, change "framing" to --control--.

Signed and Sealed this

Twenty-first Day of September 1976

[SEAL]

*Attest:*

RUTH C. MASON
*Attesting Officer*

C. MARSHALL DANN
*Commissioner of Patents and Trademarks*